US010339223B2

(12) United States Patent
Kubosawa et al.

(10) Patent No.: US 10,339,223 B2
(45) Date of Patent: Jul. 2, 2019

(54) TEXT PROCESSING SYSTEM, TEXT PROCESSING METHOD AND STORAGE MEDIUM STORING COMPUTER PROGRAM

(71) Applicant: NEC Corporation, Minato-ku, Tokyo (JP)

(72) Inventors: Shumpei Kubosawa, Tokyo (JP); Masaaki Tsuchida, Tokyo (JP); Kai Ishikawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 129 days.

(21) Appl. No.: 15/506,293

(22) PCT Filed: Aug. 20, 2015

(86) PCT No.: PCT/JP2015/004155
§ 371 (c)(1),
(2) Date: Feb. 24, 2017

(87) PCT Pub. No.: WO2016/035273
PCT Pub. Date: Mar. 10, 2016

(65) Prior Publication Data
US 2017/0255611 A1    Sep. 7, 2017

(30) Foreign Application Priority Data
Sep. 5, 2014    (JP) .................................. 2014-180828

(51) Int. Cl.
*G06F 17/27*    (2006.01)
(52) U.S. Cl.
CPC ...... *G06F 17/2785* (2013.01); *G06F 17/2705* (2013.01); *G06F 17/2755* (2013.01)
(58) Field of Classification Search
USPC ...................................................... 704/7–10
See application file for complete search history.

(56) References Cited

U.S. PATENT DOCUMENTS 8,612,207 B2 * 12/2013 Sakao ................. G06F 17/2211
704/1
8,775,158 B2 * 7/2014 Sakao ............... G06F 17/30616
704/1

(Continued)

FOREIGN PATENT DOCUMENTS

| JP | 2008-234175 A | 10/2008 |
| JP | 2009-099030 A | 5/2009 |
| JP | 2012-098797 A | 5/2012 |
| JP | 2012-164267 A | 8/2012 |
| WO | 2013/058118 A1 | 4/2013 |

OTHER PUBLICATIONS

Yotaro Watanab et al., "Overview of the Recognizing Inference in Text (RITE-2) at NTCIR-10", Proceedings of the 10th NTCIR Conference, Jun. 18-21, 2013, Tokyo, Japan, pp. 385-404.

(Continued)

*Primary Examiner* — Leonard Saint Cyr

(57) ABSTRACT

A text processing system that is able to appropriately determine textual entailment between sentences with high coverage is provided. The text processing system is configured to execute: processing of extracting a common substructure that is a partial structure of a same type, the partial structure being common to a first sentence and a second sentence and, based on the a structure representing the first sentence and a structure representing the second sentence; processing of extracting at least one of a feature amount representing a dependency relationship between the at least one common substructure in the first and second sentences and a feature amount representing a dependency relationship between the common substructure in the first and second sentences and a substructure different from the common substructure; and processing of determining an entailment relationship between the first sentence and the second sentence by using the extracted feature amount.

18 Claims, 12 Drawing Sheets

(56) References Cited

U.S. PATENT DOCUMENTS

| | | | |
|---|---|---|---|
| 2007/0282814 A1* | 12/2007 | Gupta | G06F 17/27 |
| 2008/0097951 A1* | 4/2008 | Gupta | G06F 17/2785 706/59 |
| 2008/0177531 A1* | 7/2008 | Nakagawa | G06F 17/2715 704/9 |
| 2010/0228693 A1* | 9/2010 | Dawson | G06F 17/2705 706/12 |
| 2011/0270604 A1* | 11/2011 | Qi | G06F 17/271 704/9 |
| 2012/0109960 A1 | 5/2012 | Mishina et al. | |
| 2015/0324456 A1* | 11/2015 | Kim | G06F 17/30654 707/722 |

OTHER PUBLICATIONS

Jesus Herrera, Anselmo Penas, Felisa Verdejo, "Textual Entailment Recognition Based on Dependency Analysis and WordNet", Machine Learning Challenges. Evaluating Predictive Uncertainty, Visual Object Classification, and Recognising Textual Entailment Lecture Notes in Computer Science vol. 3944, 2006.

Michael Heilman, Noah A. Smith, "Tree Edit Models for Recognizing Textual Entailments, Paraphrases, and Answers to Questions", Proceeding HLT '10 Human Language Technologies: The 2010 Annual Conference of the North American Chapter of the Association for Computational Linguistics, Jun. 2010, pp. 1011-1019.

Masaaki Tsuchida et al., "Text Analysis Technology for Big Data Utilization", NEC Technical Journal, Sep. 1, 2012, vol. 65, No. 2, pp. 77-80. (Cited in ISR).

M.W. Chang et al., "Discriminative Learning over Constrained Latent Representations", Human Language Technologies: The 2010 Annual Conference of the North American Chapter of the ACL, Association for Computational Linguistics, Jun. 30, 2010, pp. 429-437.

International Search Report for PCT Application No. PCT/JP2015/004155, dated Nov. 2, 2015.

English translation of Written opinion for PCT Application No. PCT/JP2015/004155.

* cited by examiner

TEXT PROCESSING SYSTEM, TEXT PROCESSING METHOD AND STORAGE MEDIUM STORING COMPUTER PROGRAM

This application is a National Stage Entry of PCT/JP2015/004155 filed on Aug. 20, 2015, which claims priority from Japanese Patent Application 2014-180828 filed on Sep. 5, 2014, the contents of all of which are incorporated herein by reference, in their entirety.

TECHNICAL FIELD

The present invention relates to a text processing system and the like that can recognize an entailment relationship between plural texts (sentences).

BACKGROUND ART

Technologies referred to as textual entailment recognition have been known in recent years. The textual entailment recognition is a technology of determining whether or not, with regard to two statements (sentences), one sentence (target sentence) includes a meaning represented by the other sentence (hypothetical sentence). In other words, the textual entailment recognition is considered to be a technology of recognizing (determining) an entailment relationship between two or more sentences.

In relation to such textual entailment recognition, for example, the following technologies are known.

NPL 1 discloses various technologies (techniques) proposed in relation to textual entailment recognition. In most of the techniques disclosed in NPL 1, the coverage rate of a character or a word is used to determine an entailment relationship between text. The coverage rate is the rate of an element (for example, word, clause, or the like) in a hypothetical sentence that is common to a target sentence. The coverage rate represents the possibility of entailment in a vocabulary. Therefore, the coverage rate is information (feature amount) that is commonly used in determination in the textual entailment recognition.

NPL 2 discloses an example of a technology of determining an entailment relationship between a target sentence and a hypothetical sentence. The technology disclosed in NPL 2 converts a target sentence and a hypothetical sentence into tree structures that represent dependency structures, respectively. This technology determines the entailment relationship between the target sentence and the hypothetical sentence on the basis of the rate of a subtree common to the tree structure that represents the target sentence with respect to the tree structure that represents the converted hypothetical sentence.

NPL 3 discloses another example of a technology of determining an entailment relationship between a target sentence and a hypothetical sentence. The technology disclosed in NPL 3 converts a target sentence and a hypothetical sentence into tree structures that represent dependency structures, respectively. This technology determines the entailment relationship between the target sentence and the hypothetical sentence on the basis of the number of editing operations executed when the tree structure that represents the target sentence is transformed into the tree structure that represents the hypothetical sentence. The number of the editing operations described above represents the number of operations of editing the tree structures, such as insertion, deletion, and replacement of each node constituting the tree structures, and movement of a subtree. Specifically, the technology disclosed in NPL 3 determines the entailment relationship between the target sentence and the hypothetical sentence by using a feature amount (i.e., state (degree) of difference between tree structure that represents hypothetical sentence and tree structure that represents target sentence) represented by the number of the editing operations.

The above may be summarized as follows: most of the technologies disclosed in NPL 1 are technologies of determining an entailment relationship by using a coverage rate as one of feature amounts. The technology disclosed in NPL 2 or PTL 3 is a technology to focus on whether a common node or subtree is included in a tree structure that represents a target sentence and a tree structure that represents a hypothetical sentence, or whether a node or subtree being not common is included in a tree structure that represents a target sentence and a tree structure that represents a hypothetical sentence, and to determine an entailment relationship by using such a node or subtree as a feature amount.

Hereinafter, a node and a subtree in a tree structure may be collectively referred to as "substructure".

For example, the following PTLs are disclosed as technologies of focusing on a relationship between plural texts.

PTL 1 discloses a technology of generating a new text on the basis of plural texts collected in advance. The technology disclosed in PTL 1 collects aggregated data including a pair of a text and an intention represented by the text. Such a technology makes hierarchies of plural intentions on the basis of a relationship between the intentions. Such a technology uses plural texts associated with the hierarchized intentions to combine a match portion and a unmatch portion of morphemes that constitute the texts, thereby generating a new text.

PTL 2 discloses a technology of generating a rule used in classification of a structured document such as XML (Extensible Markup Language). The technology disclosed in PTL 2 defines feature values relating to fluctuation portions in the schema of a structured document (element and attribute of structured document). The technology disclosed in PTL 2 generates a rule used in classification of plural structured documents on the basis of feature values obtained from the structured documents. Such a technology determines similarity between the structured documents on the basis of the generated rule.

PTL 3 discloses a technology of determining the similarity of description data (document or source code or the like) described based on a particular rule. The technology disclosed in PTL 3 converts plural pieces of description data described based on the particular rule (grammar or the like) into a description format such as a parse tree. Such a technology prunes the parse tree at a specific level, thereby fragmenting the parse tree into subtrees. Such a technology determines similarity between the pieces of description data by determining the similarity of the combinations of the corresponding subtrees between the plural pieces of description data.

PTL 4 discloses a technology of extracting a synonymous representation from a pair of sentences similar to each other. The technology disclosed in PTL 4 executes dependency analysis of each sentence of the pair of similar sentences. Such a technology extracts a common representation included in each sentence in common, and a different representation included only in either of the sentences on the basis of the results of the dependency analysis. The technology disclosed in PTL 4 extracts the synonymous representation on the basis of the similarity of the relative positions of the common representation arranged in the respective sentences, and the similarity of the relative positions of the different representation and the common representation.

CITATION LIST

Patent Literature

[PTL 1] Japanese Patent Laid-Open No. 2012-164267
[PTL 2] Japanese Patent Laid-Open No. 2012-098797
[PTL 3] Japanese Patent Laid-Open No. 2009-099030
[PTL 4] Japanese Patent Laid-Open No. 2008-234175

Non Patent Literature

[NPL 1] Yotaro Watanab at el, "Overview of the Recognizing Inference in Text (RITE-2) at the NTCIR-10 Conference", Proceedings of NTCIR-10 Conference, 2013
[NPL 2] Jesus Herrera, Anselmo Penas, Felisa Verdejo, "Textual Entailment Recognition Based on Dependency Analysis and WordNet", Machine Learning Challenges. Evaluating Predictive Uncertainty, Visual Object Classification, and Recognising Textual Entailment Lecture Notes in Computer Science Volume 3944, 2006, p.p. 231-239
[NPL 3] Michael Heilman, Noah A. Smith, "Tree Edit Models for Recognizing Textual Entailments, Paraphrases, and Answers to Questions", Proceeding HLT '10 Human Language Technologies: The 2010 Annual Conference of the North American Chapter of the Association for Computational Linguistics, 2010, p.p. 1011-1019

SUMMARY OF INVENTION

Technical Problem

The above-described technologies relating to textual entailment recognition have the following problems.

First, although a coverage rate is high, there may be a case that a target sentence does not entail hypothetical sentence. The technology of executing entailment recognition on the basis of a coverage rate (for example, the technologies disclosed in NPL 1) tends to determine that a target sentence entails a hypothetical sentence, when the coverage rate of hypothetical with respect to the target sentence is high. In such a case as described above, it is difficult for such a technology to correctly determine an entailment relationship (non-entailment relation) between the target sentence and the hypothetical sentence.

In order to appropriately determine an entailment relationship between a target sentence and a hypothetical sentence without depending on a coverage rate, it is effective to identify a structural difference between the sentences, influencing the entailment relationship between the target sentence and the hypothetical sentence. However, the technologies disclosed in NPL 2 and NPL 3 do not sufficiently take such a structural difference between sentences as described above into consideration. Specifically, the related technologies do not sufficiently consider a difference between the sentence structures of a target sentence and a hypothetical sentence, relating to, for example, a substructure (subtree or the like) included in the target sentence and the hypothetical sentence in common.

Thus, it is difficult for the related technology disclosed in each of the NPLs described above to appropriately determine an entailment relationship about a target sentence that does not entail a hypothetical sentence of a high coverage rate, when entailment between the sentences is determined using a coverage rate. It is also difficult for the related technology disclosed in each of the NPLs described above to identify an element (node or subtree in tree structure) that influences an entailment relationship between sentences when a feature amount used for determining the entailment relationship is generated based on the structures of the sentences.

In addition, none of the technologies disclosed in the respective PTLs described above is a technology that can directly solve the above-described problems in textual entailment recognition.

In other words, the technology disclosed in PTL 1 is merely a technology of generating a new text by using the inclusion relationship of an intention represented by a text on the assumption that information that represents the high/low-order or same order of the intention represented by the text is given in advance.

The technology disclosed in PTL 2 is a technology of classifying a structured document such as XML on the basis of a feature amount relating to the definition (schema) of a document structure in such a structured document. In other words, the technology disclosed in PTL 2 is not a technology that can be directly applied to determination of an entailment relationship relating to a document.

The technology disclosed in PTL 3 is directed at a document described according to a predetermined grammar. However, a natural language may not be necessarily described according to a correct grammar. Further, when the natural language is converted into a tree structure, there may be no entailment relationship between plural documents in consideration of the structure of the entire documents, even if the contents of subtrees in the documents are similar to each other.

PTL 4 merely discloses the technology of extracting a synonym by using pieces of document data between which a similarity relationship has been already known. In other words, the technology disclosed in PTL 4 is not a technology that can solve the above-described problems relating to determination of an entailment relationship between documents.

The present invention was accomplished in view of such circumstances as described above.

In other words, one of the main objects of the present invention is to provide a text processing system and the like that can determine an entailment relationship between plural sentences by using information that represents sentence structures. One of the main objects of the present invention is to provide, for example, a text processing system and the like that can appropriately determine an entailment relationship between sentences having high coverage rates and can identify a portion (structure) that influences the entailment relationship in each of the sentences by using information that represents sentence structures.

Solution to Problem

In order to achieve above objective, a text processing system according to one aspect of the present invention is configured as follows. That is, a text process system according to one aspect of the present invention includes a processing circuitry that is configured to execute: common substructure extraction processing of extracting a common substructure that is a partial structure of a same type, the partial structure being common to a first sentence and a second sentence and, based on the a structure representing the first sentence and a structure representing the second sentence; feature amount extraction processing of extracting at least one of a feature amount representing a dependency relationship between the at least one common substructure in the first and second sentences and a feature amount representing a dependency relationship between the common substructure in the first and second sentences and a substructure different from the common substructure; and determination processing of determining an entailment relationship between the first sentence and the second sentence by using the extracted feature amount.

A text processing method according to one aspect of the present invention is configured as follows. That is a text processing method according to one aspect of the present invention includes, by an information-processing apparatus, extracting a common substructure that is a partial structure of a same type, the partial structure being common to a first sentence and a second sentence, based on a structure representing the first sentence and a structure representing the second sentence; extracting at least one of a feature amount based on a dependency relationship between the at least one common substructure in the first and second sentences and a feature amount based on a dependency relationship between the common substructure in the first and second sentences and a substructure different from the common substructure; and determining an entailment relationship between the first sentence and the second sentence by using the extracted feature amount.

A text processing apparatus according to one aspect of the present invention is configured as follows. That is, a text processing apparatus, being a single integrated apparatus, according to one aspect of the present invention includes a processing circuitry that is configured to execute: common substructure extraction processing of extracting a common substructure that is a partial structure of a same type, the partial structure being common to a first sentence and a second sentence and, based on the a structure representing the first sentence and a structure representing the second sentence; feature amount extraction processing of extracting at least one of a feature amount representing a dependency relationship between the at least one common substructure in the first and second sentences and a feature amount representing a dependency relationship between the common substructure in the first and second sentences and a substructure different from the common substructure; and determination processing of determining an entailment relationship between the first sentence and the second sentence by using the extracted feature amount.

The objects are also achieved by a computer program that allows a computer to implement a text processing system including the configuration described above and a corresponding text processing method, and by a computer-readable storage medium on which the computer program is recorded.

Advantageous Effects of Invention

In accordance with the present invention, an entailment relationship between plural sentences can be determined by using information that represents sentence structures. In accordance with the present invention, for example, an entailment relationship between sentences having a high coverage rate can be appropriately determined, and a portion (structure) that influences the entailment relationship in each of the sentences can be identified.

DESCRIPTION OF EMBODIMENTS

Figure 1:
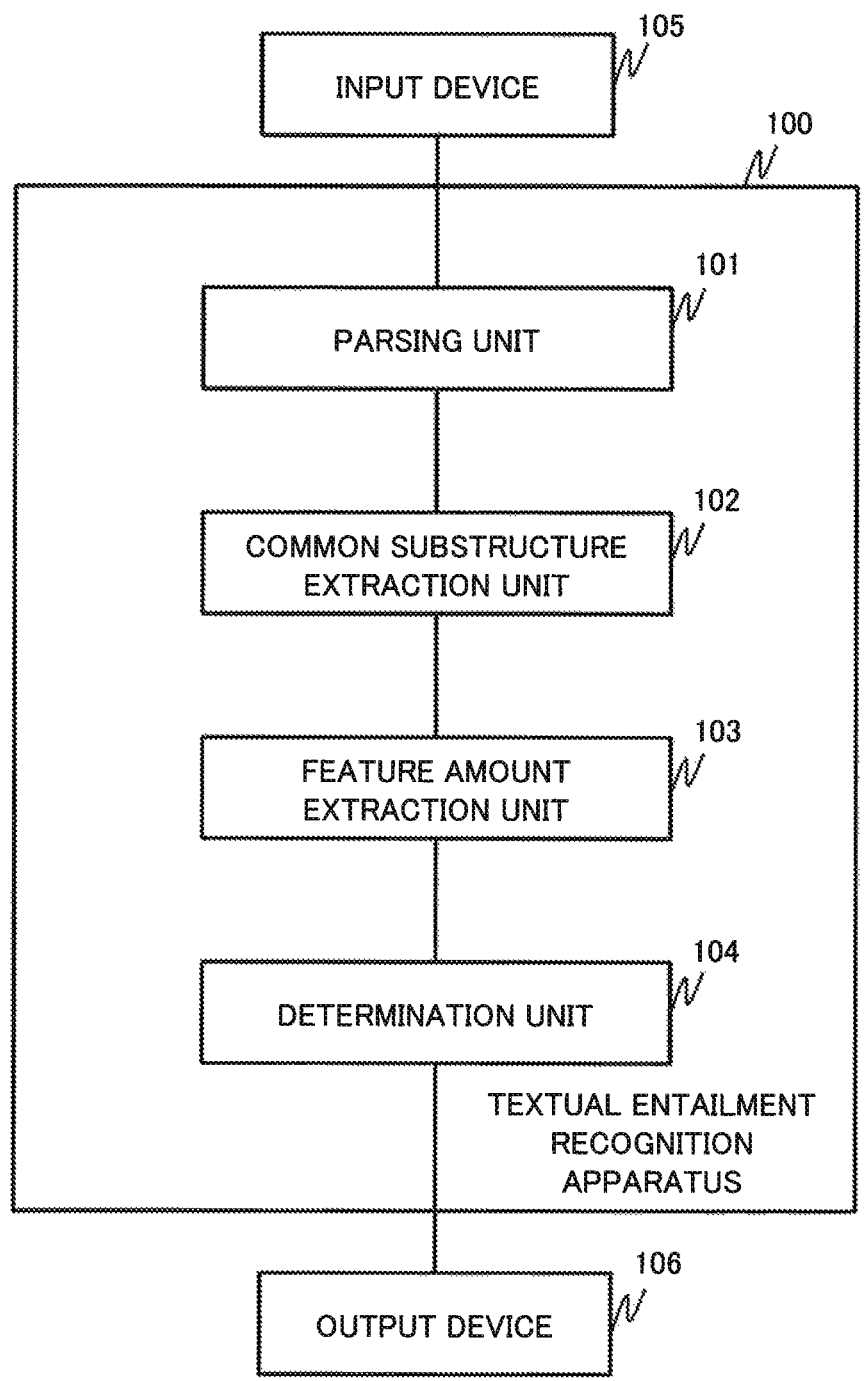
FIG. 1 is a block diagram illustrating the functional configuration of a textual entailment recognition apparatus according to a first example embodiment of the present invention.

Example embodiments of the present invention will now be described with reference to the drawings. A specific configuration described in each of the following example embodiments is one specific example that can achieve the present invention, and the technical scope of the present invention is not limited thereto.

In each example embodiment described below, "sentence" may be a simple sentence, or may be a complex sentence.

An apparatus or system described as an example in each of the following example embodiments may be configured by connecting two or more physically separated apparatuses (information-processing apparatus and the like) communicatably to each other by using any wired or wireless communication network or any combination of them.

First, a technical background, technical problems, and the like relating to the present invention will be described with reference to specific examples prior to description of each example embodiment of the present invention.

Commonly, the meaning of a sentence is determined based on lexical elements described in the sentence, and on a structure configured by a relationship between the lexical elements.

In contrast, by use of a coverage rate used in the related technologies described above (for example, NPL 1), whether there is a lexical element common to plural sentences (commonality) can be recognized. However it is difficult to recognize a difference between sentence structures by the coverage rate, as described above. Therefore, in most of techniques using a coverage rate in entailment recognition, such as the technologies disclosed in the NPL 1 described above, it may be difficult to correctly determine an entailment relationship about a hypothetical sentence that is not entailed in a target sentence although the coverage rate is high.

For example, the following causes are conceivable as reasons (causes) that a target sentence does not entail a hypothetical sentence from the structural viewpoint of a sentence.

That is, it can be one of such causes that a relationship between common substructures included in the target sentence and a relationship between common substructures included in the hypothetical sentence differ from each other, where the common substructures are substructures in the target sentence and the hypothetical sentence in common. More specifically, it can be the cause that for example, when plural common substructures are included in the target sentence and the hypothetical sentence, a relationship between the common substructures in the target sentence and a relationship between the common substructures in the hypothetical sentence differ from each other.

It can also be one of such causes that with regard to respective common substructures in the target sentence and the hypothetical sentence, substructures (for example, subtrees) which are the descendants of the respective common substructures are different from each other (mismatched).

The causes described as examples above represent that the meaning of a sentence varies according to the difference (mismatch) of a dependency relationship relating to common substructures. Such a dependency relationship represents a relationship between nodes (or between subtrees), for example, in a case in which a sentence is represented by a tree structure (hereinafter the same applies in the present application).

The above-described dependency relationship relating to the common substructures may include, for example, a connection relationship in which a specific common substructure and another common substructure are connected directly to each other. The dependency relationship relating to the common substructures may include, for example, a connection relationship in which any substructure is arranges between a specific common substructure and another common substructure.

For example, the technologies disclosed in the NPLs described above (for example, NPL 2 and NPL 3) do not take a dependency relationship relating to common substructures included in a target sentence and a hypothetical sentence into consideration. However, the dependency relationship relating to common substructures can affect an entailment relationship between sentences, as described above. In other words, considering such a dependency relationship relating to common substructures is effective for appropriately determining an entailment relationship between a target sentence and a hypothetical sentence. The above will be further described below with reference to specific examples.

First, a case in which a target sentence does not entail a hypothetical sentence although the coverage rate of the hypothetical sentence in the target sentence is high will be described with reference to specific examples. It is assumed below that a target sentence (T1) is "近年スーパーでも見かけるルッコラは ホウレンソウを小 型にしたような緑 黄色野菜でごまのよ うな味がする。" (English translation: "Rucola seen in supermarkets in recent years is a green and yellow vegetable which looks like spinach being downsized, and has a taste similar to a taste of sesame.") as a specific example. Further, it is assumed that a hypothetical sentence (H1) is "ルッコラはホウレ ·ンソウのような味 がする" (English Translation: "Rucola has a taste similar to a taste of spinach").

According to each clause included in the target sentence T1 described above, the original form of a morpheme representing the meaning of the clause can be listed like the following representative morpheme string "T1-M". In other words, the representative morpheme string "T1-M" is "スーパー， 見かける， ルッコラ， ホウレンソウ， 小型， する、 野菜， ごま， 味， する" (English translation: supermarket, seen, rucola, spinach, downsized, being, vegetable, sesame, taste, have). Similarly, the representative morpheme string "H1-M" with regard to the hypothetical sentence H1 is "ルッコラ， ホウレンソウ， 味， する" (English translation: rucola, spinach, taste, have).

Each of elements of the representative morpheme string "H1-M" are common to elements of the representative morpheme string "T1-M". In other words, the representative morpheme string "T1-M" includes all the elements of the representative morpheme string "H1-M". Thus, the hypothetical sentence H1 is completely covered with the target sentence T1. In this case, the coverage rate of the target sentence T1 and the hypothetical sentence H1 in view of the representative morphemes is the highest (coverage rate: "1"); however, the target sentence T1 does not entail the hypothetical sentence H1.

For example, in the technologies disclosed in the NPL 1 described above, an entailment relationship between sentences is determined primarily based on a coverage rate, and therefore, it may be difficult to correctly determine the entailment relationship between the target sentence T1 and the hypothetical sentence H1 described as an example above.

In the following, by taking a target sentence T1 and a hypothetical sentence H1 as specific examples, it will now be described that it is difficult for the related technologies disclosed in each of the NPLs described above to identify a sentence structure (portion) that influences an entailment relationship between the target sentence and the hypothetical sentence.

First, it is assumed that tree T1 and a tree H1 may be obtained by converting the target sentence T1 and the hypothetical sentence H1 described above into tree structures representing dependency relations on clause units, respectively, on the basis of the Japanese grammar. A morpheme that semantically represents each clause of the respective sentences (T1, H1) is assigned as a label to nodes (nodes in tree structures) that constitute the tree T1 and the tree H1.

In the following description, when a tree structure is represented using a character string, each node included in a node string obtained by scanning the tree structure in pre-order is represented using a label assigned to the node. A subtree including a particular node as the top (root node of the subtree) and its descendant (child node) is represented between an opened parenthesis sign and a closing parenthesis sign in a pair.

Figure 10:
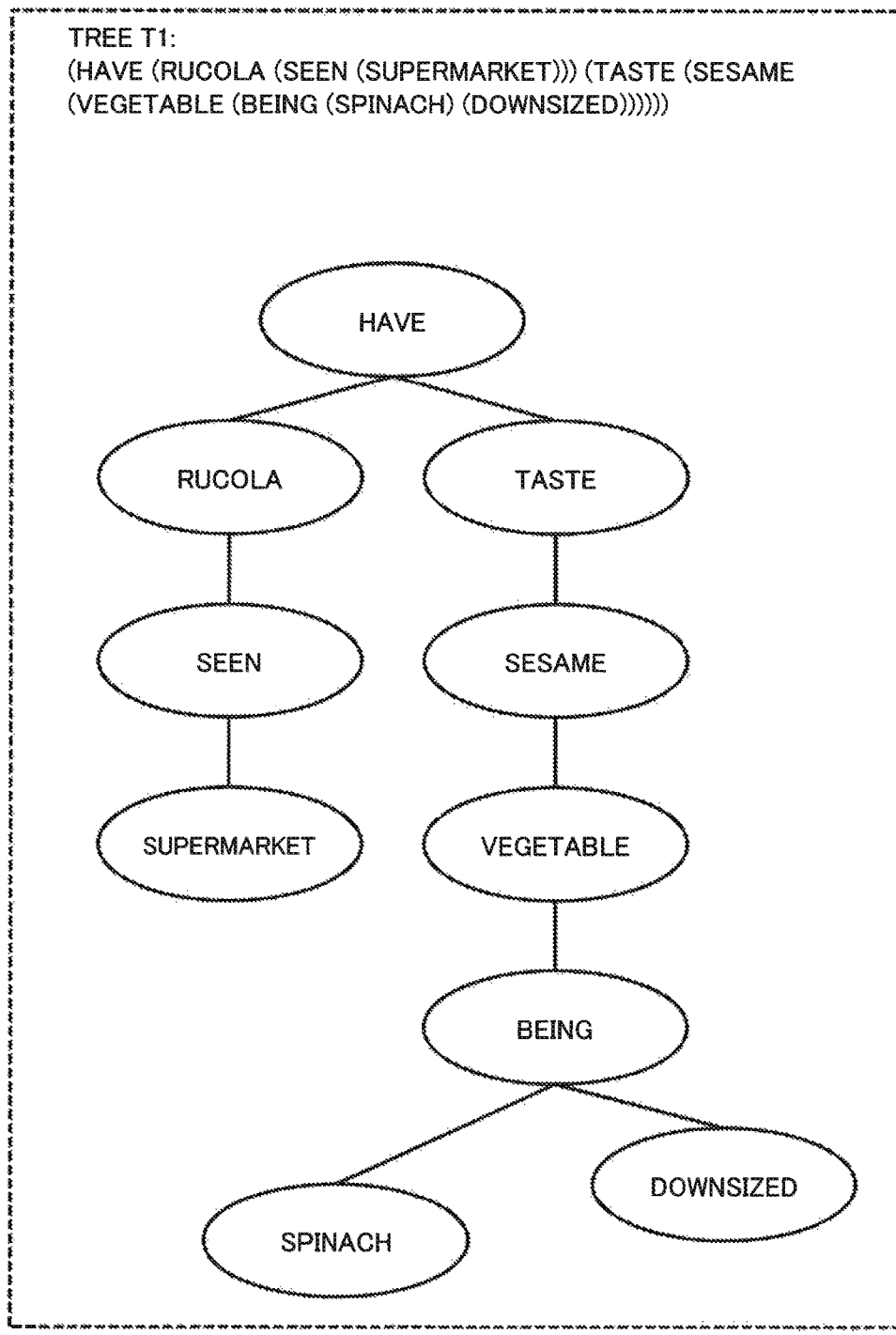
FIG. 10 is a view (1/2) illustrating a specific example in which a specific sentence is represented by a tree structure in the first example embodiment of the present invention.

For example, the tree T1 represented using the character string by the method described above is represented as "(する(ルッコラ(見かける(スーパー)))(味(ごま(野菜(する(ホウレンソウ)(小型))))))" [English translation: (have (rucola (seen (supermarket))) (taste (sesame (vegetable) (being (spinach) (downsized))))))] (see FIG. 10).

The root node of the tree T1 is "(する)" [English translation: (have)], and the child nodes of the root node are two of "(ルッコラ)" [English translation: (rucola)] and "(味)" [English translation: (taste)] in the order from the left. The node "(味)" [English translation: (taste)] includes six descendant nodes including the node constituting its own.

Figure 11:
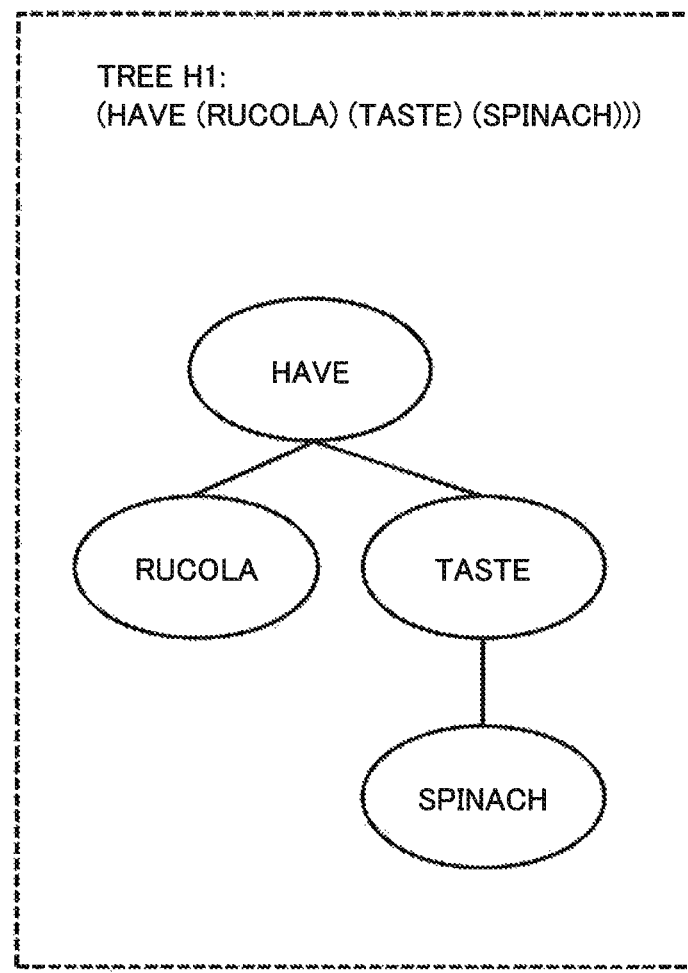
FIG. 11 is a view (2/2) illustrating a specific example in which a specific sentence is represented by a tree structure in the first example embodiment of the present invention.

Similarly, the tree H1 represented using the character string is represented as "(する(ルッコラ)(味(ホウレンソウ)))" [English translation: (have (rucola) (taste (spinach)))] (see FIG. 11).

In the method disclosed in the NPL 2 described above, an entailment relationship between the target sentence T1 and the hypothetical sentence H1 is determined by using the rate of a common subtree being common to the tree T1 and the tree H1, in the tree H1. The NPL 2 described above is based on a hypothesis that a possibility that a target sentence entails a hypothetical sentence is increased when the rate of a common subtree increases.

However, the technique disclosed in the NPL 2 described above does not sufficiently take the structure of a portion different from a common subtree in a target sentence and a hypothetical sentence into consideration. A description is given with reference to a specific example as follows: the rate of a common subtree with respect to the tree H1 is the highest because the tree H1 is constituted only by a subtree of the tree T1. However, the target sentence T1 does not entail the hypothetical sentence H1. Thus, the technique disclosed in the NPL 2 described above may fail to correctly determine such an entailment relationship between T1 and H1.

Thus, correct entailment determination may be difficult when the rate of a common tree structure (subtree) between a tree structure that represents a hypothetical sentence and a tree structure that represents a target sentence in the target sentence is used as a feature amount. Further, it is difficult to identify a portion (structure) that influences an entailment relationship in the target sentence or the hypothetical sentence because the method disclosed in the NPL 2 described above focuses only on the rate of common substructures.

Then, the technique disclosed in NPL 3 uses the following feature amount as an input into a classifier used in entailment determination by machine learning. That is, such a feature amount represents operation (editing operation) occurring when a tree structure that represents a target sentence is converted into a tree structure that represents a hypothetical sentence. For example, the editing operation of such a tree structure may include replacement, deletion, and insertion of a node, and movement of a subtree.

A description will be given using the target sentence T1 and hypothetical sentence H1 described above. Editing operation occurring when the tree T1 is converted into the tree H1 includes, for example, replacement of four nodes ("(する)" [English translation: (have)], "(ルッコラ)" [English translation: (rucola)], "(味)" [English translation: (taste)], "(ホウレンソウ)" [English translation: (spinach)]) in the tree T1. Further, the editing operation includes, for example, operation of deleting six nodes of "(見かける)" [English translation: (seen)], "(スーパー)" [English translation: (supermarket)], "(ごま)" [English translation: (sesame)], "(野菜)" [English translation: (vegetable)], "(する)" [English translation: (being)], and "(小型)" [English translation: (downsized)] from the tree T1.

One of reasons that the target sentence T1 does not entail the hypothetical sentence H1 is in that the subtree "(ごま(野菜(する(小型))))" [English translation: (sesame (vegetable (being (downsized))))] exists between the common subtrees "(する(ルッコラ)(味(ホウレンソウ)))" [English translation: (have (rucola) (taste) (spinach)))] and "(ホウレンソウ)" [English translation: (spinach)] in the tree T1. "(見かける(スーパー))" [English translation: (seen (supermarket))] which is the other portion of the tree T1 does not greatly affect the entailment relationship between the tree T1 and the tree H1.

The NPL 3 described above focuses on common substructures obtained by moving operation of a subtree, replacing operation of a node, or the like in tree structures that represent a target sentence and a hypothetical sentence. However, a portion that exists between common substructures in each document (for example, "(ごま(野菜(する(小型))))" [English translation: (sesame (vegetable (being (downsized))))] in the T1 described above) and another portion (for example, "(見かける(スーパー))" [English translation: (seen (supermarket))] in the T1 described above) are not distinguished from each other the NPL 3 described above. Therefore, in the NPL 3 described above, it is difficult to identify an element that greatly affects an entailment relationship between a specific target sentence and a specific hypothetical sentence.

As described above, the technologies disclosed in the NPL 2 and NPL 3 do not sufficiently take a difference between a relationship between substructures in a target sentence in common and a relationship between substructures in a hypothetical sentence in common into consideration. For example, in the specific example described above, such a difference appears in a subtree that exists in a path between common subtrees "(する(ルッコラ)(味(ホウレンソウ)))" [English translation: (have (rucola) (taste (spinach)))] and "(ホウレンソウ)" [English translation: (spinach)] in the tree T1 and the tree H1, respectively.

The technologies disclosed in the NPL 2 and NPL 3 described above do not sufficiently take a difference between a descendant node in each substructure in a target sentence in common and a descendant node in each substructure in a hypothetical sentence in common into consideration. For example, in the specific example described above, such a difference appears between the descendant nodes of common subtrees "(する(ルッコラ)(味(ホウレンソウ)))" [English translation: (have (rucola) (taste (spinach)))] and "(ホウレンソウ)" [English translation: (spinach)] in the tree T1 and the tree H1, respectively.

Thus, it is difficult for the related technologies disclosed in each of the NPLs described above to determine a correct entailment relationship in a target sentence which does not entail a hypothetical sentence having a high coverage rate. Further, it is difficult for the related technologies disclosed in each of the NPLs described above to identify an element (node or subtree in tree structure) that affects an entailment relationship between sentences. Example embodiments of the present invention, which can solve such problems as described above, will be described below.

<First Example Embodiment>

A first example embodiment for carrying out the present invention will be described in detail below with reference to the drawings.

FIG. 1 is a block diagram illustrating the functional configuration of a textual entailment recognition apparatus according to the first example embodiment of the present invention.

A textual entailment recognition apparatus 100 is an apparatus that can determine whether or not a target sentence entails a hypothetical sentence when a target sentence and a hypothetical sentence are supplied.

The textual entailment recognition apparatus 100 according to the first example embodiment includes a parsing unit 101, a common substructure extraction unit 102, a feature amount extraction unit 103, and a determination unit 104. The textual entailment recognition apparatus 100 in the present example embodiment may be connected communicatively to an input device 105 and an output device 106 with the use of any communication means (communication network, communication line, or the like).

The parsing unit 101 analyzes the dependency structures of the input hypothetical sentence and the input target sentence, respectively. As a result, the parsing unit 101 converts the hypothetical sentence and the target sentence into tree structures that represent the dependency structures, respectively. In such a case, the parsing unit 101 may execute, for example, morphological analysis, parsing, or the like on the input hypothetical sentence and the input target sentence to, by using a known technology.

In the present example embodiment, "tree structure" is a structure in which one or more nodes are connected with a branch (link, edge). Each node in such a tree structure may have a descendant node or an ancestor node. A node having a descendant node is an ancestor node in the point of view from the descendant node. Further, a node having an ancestor node is a descendant node in the point of view from the ancestor node. Such a tree structure may include a root node that does not have an ancestor node. Part of the tree structure configured by any one or more nodes that configure the tree structure may be referred to as a subtree. Such "tree structure" can be implemented with the use of a known general data structure or the like. The dependency structures of the hypothetical sentence and the target sentence are structures that represent relationships between elements into which the respective sentences are fragmented (for example, morpheme, word, clause, and the like).

A specific example described below is an example in which a Japanese sentence is analyzed based on the Japanese grammar, but the present example embodiment is not limited thereto. The present example embodiment can be applied to a language other than the Japanese language as long as, for example, a sentence structure (syntax, dependency relationship, or the like) in the language can be analyzed.

Specifically, the parsing unit 101 converts, for example, a sentence of "近年スーパーでも見かけるルッコラはホウレンソウを小型にしたような緑 黄色野菜でごまのような味がする。" (English Translation: "Rucola seen in supermarkets in recent years is a green and yellow vegetable which looks like spinach being downsized, and has a taste similar to a taste of sesame.") into tree structures that represent dependency structures in clause units. The parsing unit 101 assigns the original forms of morphemes that semantically represent clauses, as labels, to the corresponding nodes of such a tree structure. In such a case, the example sentence described above is converted into "する(ルッコラ(見かける(スーパー)))(味(ごま(野菜(する(ホウレンソウ)(小型)))))))" [English translation: (have (rucola (seen (supermarket))) (taste (sesame (vegetable (being (spinach) (downsized))))))].

The common substructure extraction unit 102 extracts a substructure (common substructure), in common, in a tree structure that represents a target sentence and a tree structure that represents a hypothetical sentence, converted by the parsing unit 101. Such a common substructure may be a subtree in the tree structure that represents each of the sentences described above. When such plural common substructures exist, the common substructure extraction unit 102 selects the common substructures without overlaps, for example, in decreasing order of the number of included nodes from the common substructure including largest number of nodes.

Specifically, the common substructure extraction unit 102 extracts, for example, "(する(ルッコラ)(味))" [English translation: (have (rucola) (taste))] as a common substructure from a tree structure that represents a target sentence "(する(ルッコラ)(味(ごま)))" [English translation: (have (rucola) (taste (sesame)))] and a tree structure that represents a hypothetical sentence "(する(ルッコラ)(味(ホウレンソウ)))" [English translation: (have (rucola) (taste (spinach)))].

The feature amount extraction unit 103 extracts a feature amount capable of determining an entailment relationship between a target sentence and a hypothetical sentence, by use of a tree structure that represents the target sentence, a tree structure that represents the hypothetical sentence, and a common substructure in the tree structures.

A feature amount in the present example embodiment is information relating to common substructures in a structure (for example, tree structure) that represents a target sentence or a hypothetical sentence. The information relating to the common substructures includes at least one of information that represents a dependency relationship between one or more common substructures in the structure that represents the target sentence or the hypothetical sentence, and information that represents a dependency relationship between a common substructure and another substructure.

The information that represents the dependency relationship between the common substructures may include, for example, information that represents a connection relationship between another substructure existing between one or more common substructures and the common substructures. The information that represents the dependency relationship between the common substructures may include the information of the other substructure itself (the number of nodes included in tree structure, attributes of nodes, and the like) existing between one or more common substructures, and the like.

The information that represents the dependency relationship between the common substructure and the other substructure may include, for example, information that represents a connection relationship between the common substructure and the other substructure. The information that represents the dependency relationship between the common substructure and the other substructure may include the information of the other substructure itself (the number of nodes included in tree structure, attributes of nodes, and the like), and the like.

More specifically, the feature amount extraction unit 103 may extract, as a feature amount, for example, a difference (match or mismatch) between dependency relationships between respective common substructures in a target sentence and a hypothetical sentence. The feature amount extraction unit 103 may extract, as feature amounts, for example, the number of nodes, the attributes of the nodes, and the like in each substructure existing between common substructures, and a substructure including the descendant of each common substructure.

Such feature amounts will be described below with reference to a simple specific example. In the following specific example, it is assumed that a tree structure that represents a target sentence is "(する(ルッコラ)(味(ごま)))" [English translation: (have (rucola) (taste) (sesame)))], and a tree structure that represents a hypothetical sentence is "(する(ルッコラ)(味(ホウレンソウ)))" [English translation: (have (rucola) (taste) (spinach)))]. In such a case, common substructures in the tree structure that represents the target sentence and the tree structure that represents the hypothetical sentence are "(する(ルッコラ))" [English translation: (have (rucola))] and "(味)" [English translation: (taste)].

The feature amount extraction unit 103 extracts, for example, the following feature amounts with the use of the tree structure that represents the target sentence, the tree structure that represents the hypothetical sentence, and the common substructures in the tree structure that represents the target sentence and the tree structure that represents the hypothetical sentence.

That is, the feature amount extraction unit 103 extracts, for example, a feature amount of "the number of mismatched dependency relationships in common substructures is zero (0)" in the case of the specific example described above.

Further, the feature amount extraction unit 103 extracts, for example, a feature amount of "the total number of nodes in substructures between common substructures in a target sentence is zero (0)".

Further, the feature amount extraction unit 103 extracts, for example, a feature amount of "the total number of nodes in substructures between common substructures in a hypothetical sentence is zero (0)".

Further, the feature amount extraction unit 103 extracts, for example, a feature amount of "the number of predicate nodes in substructures between common substructures in a target sentence is zero (0)". Such "predicate node" represents, for example, a node in which a predicate is included in a clause that is the attribute of the node.

Further, the feature amount extraction unit 103 extracts, for example, a feature amount of "the number of predicate nodes in substructures between common substructures in a hypothetical sentence is zero (0)".

Further, the feature amount extraction unit 103 extracts, for example, a feature amount of "the number of mismatched substructures including the descendants of common substructures is one (1)".

Further, the feature amount extraction unit 103 extracts, for example, a feature amount of "the number of differences between (spinach) and (sesame) in the descendants of common substructures is one (1)".

The feature amount extraction unit 103 is not limited to the above, and may extract another arbitrary feature amount.

The determination unit 104 determines whether a target sentence entails a hypothetical sentence, on the basis of a feature amount extracted (output) by the feature amount extraction unit 103, and a predetermined discrimination rule.

The determination unit 104 may determine an entailment relationship between a target sentence and a hypothetical sentence on the basis of a feature vector including the feature amount extracted from the target sentence and the hypothetical sentence, and a discriminant model, by using, for example, a known pattern recognition technology such as a support vector machine.

For example, when an entailment relationship is determined by using a support vector machine, the determination unit 104 can determine an entailment relationship between a target sentence and a hypothetical sentence by using a feature vector including a feature amount extracted from the target sentence and the hypothetical sentence, and a discriminant hyperplane based on a discriminant model. More specifically, the determination unit 104 may determine that the target sentence described above entails the hypothetical sentence described above, for example, when the feature vector described above exists in an entailment-side on discriminant hyperplane, in hyperspace which being divided by the discriminant hyperplane.

The input device 105 is any device that can supply a target sentence and a hypothetical sentence into the textual entailment recognition apparatus 100. The input device 105 may be, for example, an input device such as a keyboard or a mouse, or may be an information-processing apparatus to which such an input device is connected. In such a case, the input device 105 may send, to the textual entailment recognition apparatus 100, a target sentence, a hypothetical sentence, and the like input via the input device. The input device 105 is not limited to the above, and may be any database, file server, or the like in which a target sentence, a hypothetical sentence, and the like are stored.

The output device 106 is any device that can output the result of entailment recognition in the textual entailment recognition apparatus 100, and the like. The output device 106 may be an output device such as a display or a printer, or may be an information-processing apparatus to which such an output device is connected. In such a case, the output device 106 may accept (receive) the result of entailment recognition, and the like from the textual entailment recognition apparatus 100, and may output such a result to the output device.

Detailed description of communication method that connects the input device 105, output device 106 and the textual entailment recognition apparatus 100 to each other is omitted, because a known technology may be adopted as the communication means as appropriate.

The operation of the textual entailment recognition apparatus 100 configured as described above will be described with reference to the flowcharts of FIG. 2 and FIG. 3.

When a target sentence and a hypothetical sentence are input from the input device 105 into the parsing unit 101, the parsing unit 101 parses each of the target sentence and the hypothetical sentence, and converts the target sentence and the hypothetical sentence into tree structures that can represent dependency relationships (step S201). Hereinafter, such a tree structure that can represent a dependency relationship may be referred to as "dependency structure".

More specifically, the parsing unit 101 executes morphological analysis of the input target sentence and the input hypothetical sentence, and executes parsing using the result of morphological analysis. In such a case, the parsing unit 101 converts each input sentence into the tree structure on the basis of dependency relationship between each clauses.

Then, the parsing unit 101 assigns a label to each unit (node constituting tree structure) of the dependency structures, and generates labeled tree structures (step S202).

An example in which a sentence described in the Japanese language is converted into a dependency structure that represents a dependency structure on the basis of the Japanese grammar, will be described below. For example, the parsing unit 101 separates a sentence of "ルッコラはホウレンソウのような味がする" (English Translation: "Rucola has a taste similar to a taste of spinach") into clauses of "ルッコラは, ホウレンソウの ような, 味 が, する。" [English translation: Rucola, has, a taste, similar to a taste of spinach.]. The parsing unit 101 assigns the respective clauses with morphemes that semantically represent the clauses, as labels. Then, the parsing unit 101 converts the sentence described above into a tree structure of "(する(ルッコラ)(味(ホウレンソウ)))" [English translation: "(have (rucola) (taste (spinach)))"] by using dependency relationships between the separated clauses, and the labels of the clauses. In such a case, the parsing unit 101 sets each clause separated as described above (or each of morphemes that represents the clauses) as the attribute of each node that constitutes the tree structures.

Then, the common substructure extraction unit 102 finds, from the tree structure that represents the target sentence and that tree structure that represents the hypothetical sentence, generated in step S202 described above, candidates for substructures that are common to these tree structures and have the same type (hereinafter may be referred to as "common substructure candidates"). The common substructure extraction unit 102 extracts common substructures without overlaps in decreasing order of the number of included nodes from the candidate including the largest number of nodes, among the zero or more common substructure candidates being found (step S203).

The operation of step S203 will be described in detail below with reference to FIG. 3.

Figure 3:
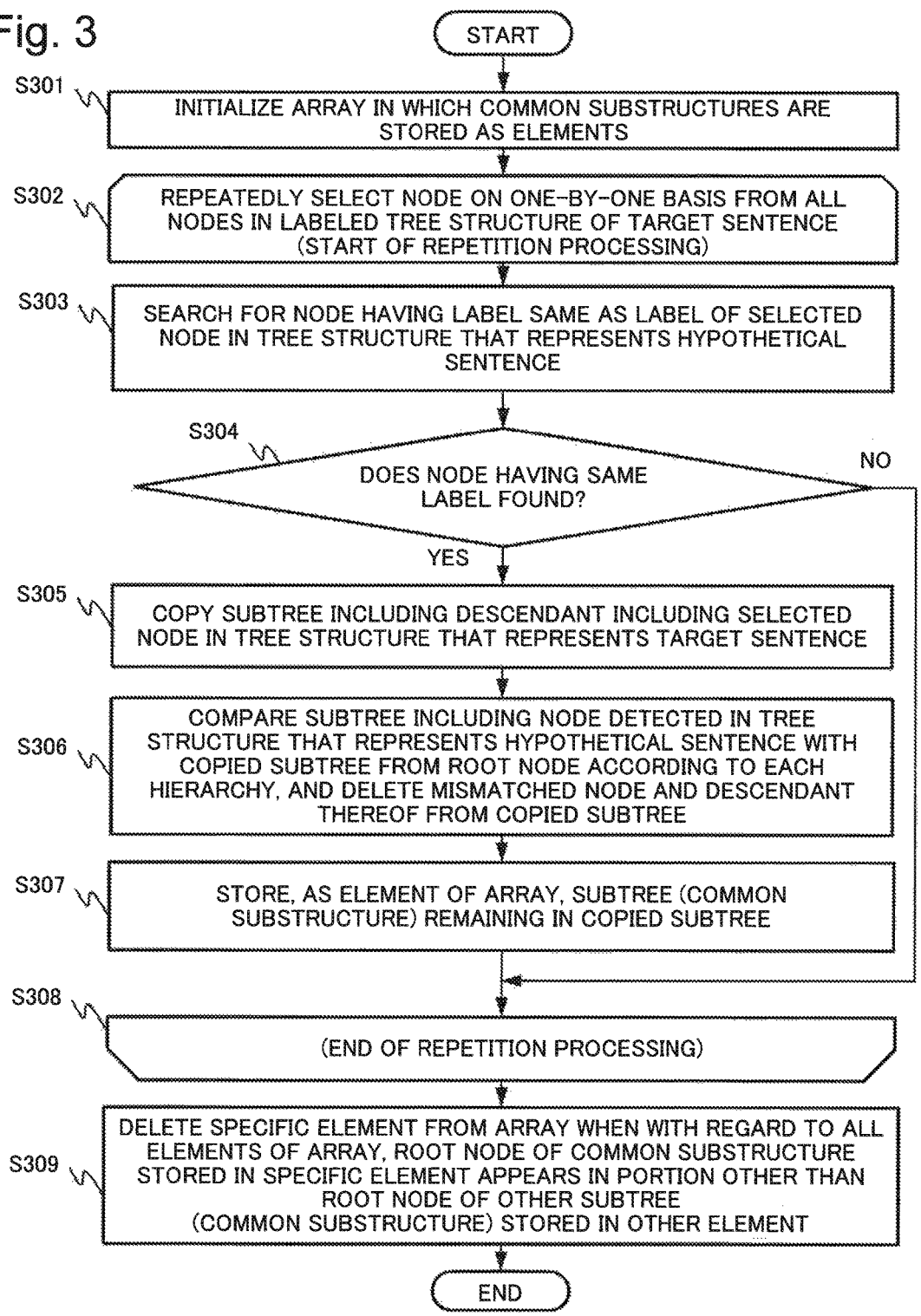
FIG. 3 is a flowchart illustrating the operation of extracting a common substructure in the textual entailment recognition apparatus according to the first example embodiment of the present invention.

FIG. 3 is a flowchart illustrating a specific example of the operation of extracting a common substructure in the textual entailment recognition apparatus 100 according to the first example embodiment of the present invention.

First, the common substructure extraction unit 102 initializes an array in which extracted common substructures are stored as elements (step S301).

Then, the common substructure extraction unit 102 selects each node on a one-by-one basis from all nodes constituting the labeled tree structure that represents the target sentence, and repeats processing of steps S303 to 307 described below (step S302 to step S308).

First, the common substructure extraction unit 102 searches for a node assigned with the same label as that of the node selected in step S301, from the labeled tree structure that represents the hypothetical sentence (step S303).

When any node with the same label does not detected in the tree structure that represents the hypothetical sentence as a result of the search (NO in step S304), the common substructure extraction unit 102 returns to step S302, continues the processing, and selects the next node from the target sentence.

When a node with the same label is found in the tree structure that represents the hypothetical sentence, as a result of the search (YES in step S304), the common substructure extraction unit 102 copies a substructure (for example, subtree) including the node selected in step S301 as a root node, from the target sentence (step S305).

Then, the common substructure extraction unit 102 compares the substructure (in hypothetical sentence) including the node detected in step S303 as the root node, with the substructure copied from the target sentence in step S305, from the root node according to each hierarchy. The common substructure extraction unit 102 deletes a node different (mismatched) in each substructure from the substructure copied in step S305 (step S306). More specifically, the common substructure extraction unit 102 extracts a node mismatched between the substructure of which root node is the node detected in step S303 and the substructure copied in step S305, and a subtree which is the descendant of the mismatched node. The common substructure extraction unit 102 deletes the extracted subtree from the substructure copied in step S305.

Then, the common substructure extraction unit 102 stores a substructure (common substructure candidate) obtained as a result of deleting the mismatched node and the like from the substructure copied in step S305 (step S306 described above), in the array generated in step S301 (step S307).

Then, the common substructure extraction unit 102 returns to step S301, and selects the next node from the tree structure that represents the target sentence (step S301).

When the above-described processing is executed for all the nodes (step S308), the common substructure extraction unit 102 deletes an element that overlaps with part (for example, subtree or node) of another element among all the elements (common substructure candidates) stored in the array generated in step S301 (step S309).

More specifically, when the root node of a common substructure candidate stored in a specific element of the array described above is included in a portion other than the root node of a common substructure candidate stored in another element of the array described above, the common substructure extraction unit 102 deletes the specific element from the array described above.

In the above description, the extracted common substructures are stored in the array as a specific example; however, the present example embodiment is not limited thereto. In the common substructure extraction unit 102, an extracted common substructure may be stored with the use of any data structure.

Figure 4:
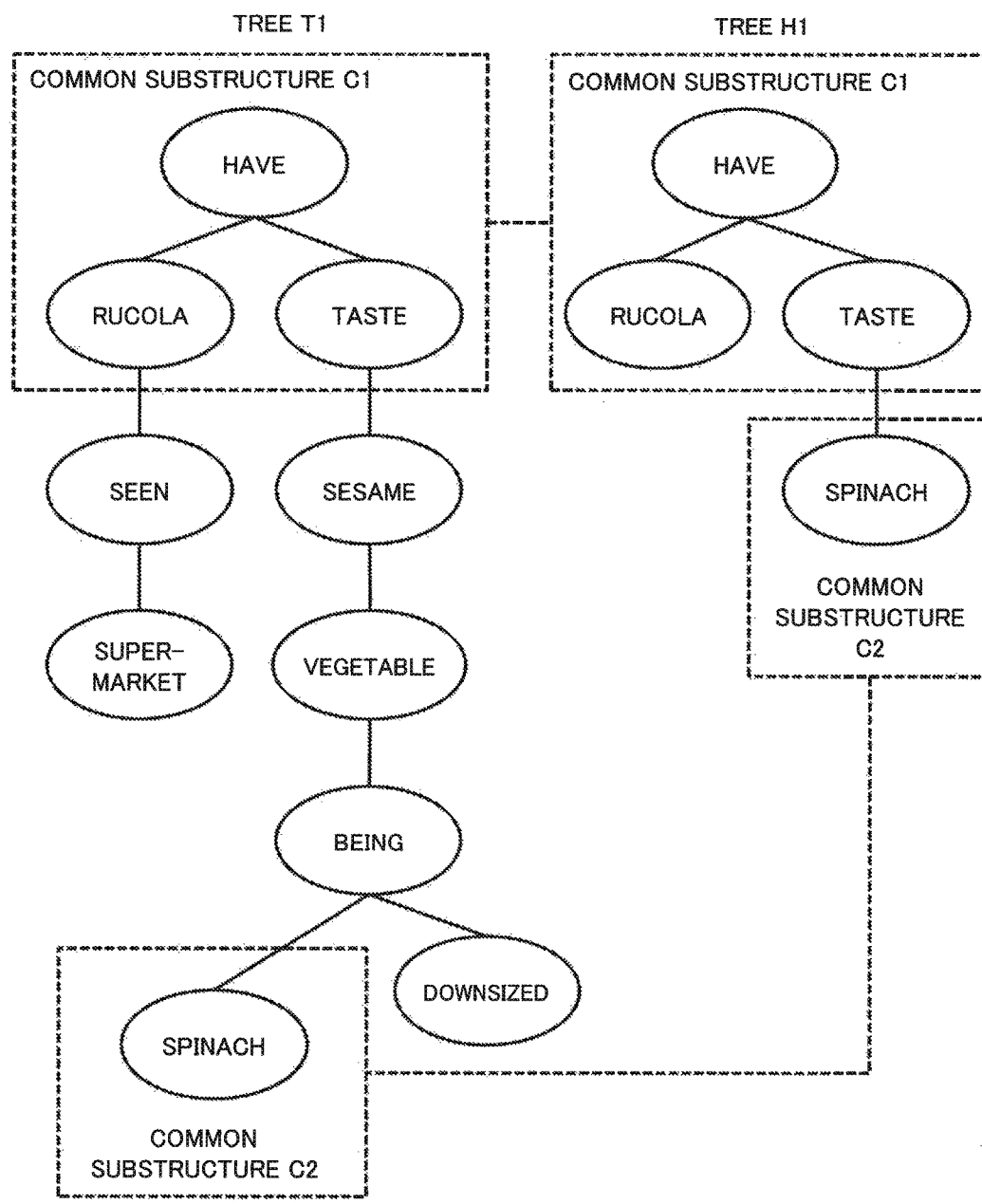
FIG. 4 is a view illustrating a specific example of common substructures extracted in the textual entailment recognition apparatus according to the first example embodiment of the present invention.

FIG. 4 is a view illustrating a specific example of common substructures extracted in the textual entailment recognition apparatus according to the first example embodiment of the present invention.

In the specific example illustrated in FIG. 4, it is assumed that a target sentence T1 is "近年スーパーで 見かけるルッコラ はホウレン ソウを小 型にしたような 緑黄色野菜でご まのような味 がする。" (English Translation: "Rucola seen in supermarkets in recent years is a green and yellow vegetable which looks like spinach being downsized, and has a taste similar to a taste of sesame."). Further, it is assumed that a hypothetical sentence (H1) is "ルッコラはホウ レンソウのよう な味がする" (English Translation: "Rucola has a taste similar to a taste of spinach").

In such a case, a tree T1 that represents the target sentence T1 is "(する(ルッコラ(見かける(スーパー )))(味(ごま(野菜(する(ホウレンソウ)(小 型))))))" [English translation: (have (rucola (seen (supermarket))) (taste (sesame (vegetables (being (spinach) (downsized))))))]. A tree H1 that represents the hypothetical sentence H1, "(する(ルッコラ)(味(ホウレンソ ウ)))" [English translation: (have (rucola) (taste (spinach)))].

The common substructure extraction unit 102 extracts common substructure candidates in decreasing order of the number of included nodes from the common substructure including the largest number nodes, among common substructures having the same type included in the tree T1 and the tree H1. As a result, a substructure C1 "(する(ルッコラ )(味 ))" [English translation: (have (rucola) (taste))] and a substructure C2 "(ホウレ ンソウ )" [English translation: (spinach)] are extracted as the common substructures.

Figure 2:
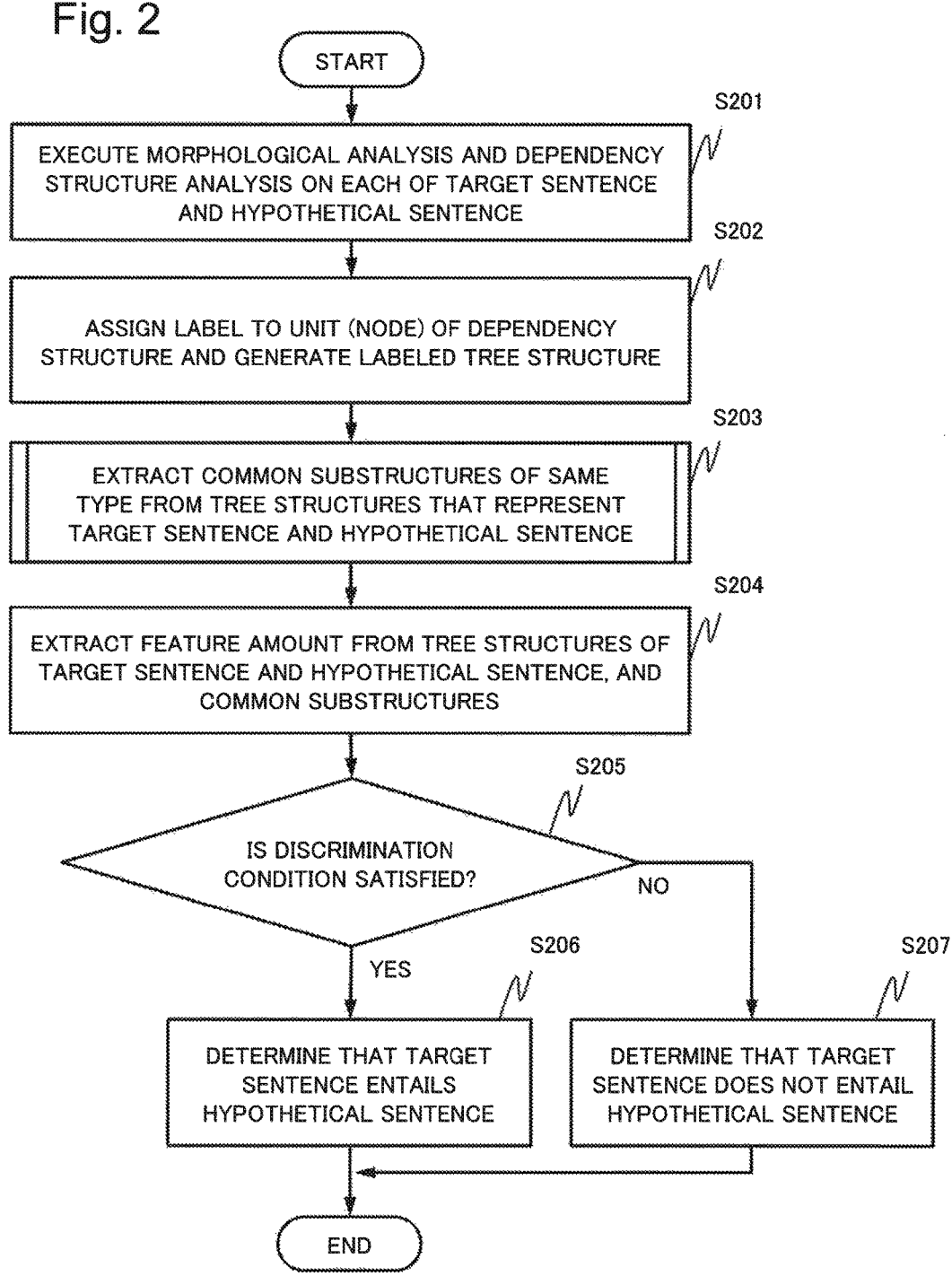
FIG. 2 is a flowchart illustrating the operation of the textual entailment recognition apparatus according to the first example embodiment of the present invention.

Returning again to the flowchart illustrated in FIG. 2, the feature amount extraction unit 103 extracts a feature amount with the use of each common substructure extracted by the common substructure extraction unit 102, and the tree structures into which the target sentence and the hypothetical sentence are converted (step S204). Such a feature amount is used when an entailment relationship between the target sentence and the hypothetical sentence is determined.

The feature amount extraction unit 103 may extract the above-described feature amount on the basis of a dependency relationship between one or more common substructures in the target sentence and the hypothetical sentence. Further, the feature amount extraction unit 103 may extract the above-described feature amount on the basis of a dependency relationship between a common substructure in the target sentence and the hypothetical sentence and another substructure different from the common substructure. In other words, the feature amount extraction unit 103 extracts the above-described feature amount on the basis of at least one of the dependency relationship between the one or more common substructures in the target sentence and the hypothetical sentence, and the dependency relationship between the common substructure and the other substructure.

The dependency relationship between the one or more common substructures may include a dependency relationship between a common substructure in each sentence and a substructure that exists between common substructures. The dependency relationship between the one or more common substructures may include the structure of another substructure itself that exists between common substructures in each sentence, the attribute of a node included in the other substructure, and the like.

The dependency relationship between the common substructure and the other substructure different from the common substructure may include the structure and attribute of the descendant (subtree or node) of a common substructure that does not exist between common substructures in each sentence, and the like.

More specifically, the feature amount extraction unit 103 may detect a difference between each relationship between the common substructures included in the target sentence and each relationship between the common portions included in the hypothetical sentence, and may output the difference as a feature amount. The feature amount extraction unit 103 may extract a feature amount from each substructure that exists between the common substructures. The feature amount extraction unit 103 may extract a feature amount from a substructure including the descendant of each common substructure.

For example, it is assumed that a target sentence is the target sentence T1 described above, and a hypothetical sentence is the hypothetical sentence H1 described above. In such a case, a subtree (hereinafter referred to as "subtree A1") constituted by a path between the subtree C1 and the subtree C2 in the tree T1 is "(ごま(野菜(する)))" [English translation: (sesame (vegetables (being)))]. In the tree H1, any other substructure (subtree) does not exist between the subtree C1 and the subtree C2. In the following, "(ごま(野菜(する(小型))))" [English translation: (sesame (vegetable (being (downsized))))] may be used as a subtree (hereinafter referred to as "subtree X1") that exists in a path between the subtree C1 (substructure C1) and the subtree C2 (substructure C2) in the tree T1, instead of A1 (or in addition to A1).

The feature amount extraction unit 103 extracts the above-described feature amount by using, for example, each subtree described below. In other words, the subtree used in the extraction of such a feature amount may be the subtree A1 described above. The subtree used in the extraction of such a feature amount may be each subtree that is the descendant of the subtree C1 or the subtree C2 in the tree H1, and that does not exist between common substructures. The subtree used in the extraction of such a feature amount may be each subtree that is the descendant of the subtree C1 or the subtree C2 in the tree T1, or that does not exist between common substructures.

The feature amount may include any one or more of, for example, the number of nodes included in the subtrees described above, a label set in each node that constitutes the subtrees, and the component of a clause set as an attribute in each node. The feature amount may include the number of nodes from the root node to the subtree C1 or the subtree C2 in the tree T1 or the tree H1. The feature amount may include information relating to a difference (match or mismatch) between the dependency relationship between the subtree C1 and the subtree C2 in the tree T1 and the dependency relationship between the subtree C1 and the subtree C2 in the tree H1.

The above is merely an example, and the feature amount in the present example embodiment is not limited to the above. In other words, the feature amount extraction unit 103 may extract any feature amount on the basis of a dependency relationship (connection relationship) between A1 that exists between the common substructures (between C1 and C2) in the tree T1, and C1 (or C2). The feature amount extraction unit 103 may extract any feature amount from the structure of A1 in itself, the attributes of nodes constituting A1, and the like.

The feature amount extraction unit 103 may extract any feature amount on the basis of a dependency relationship (connection relationship) between each subtree that is the descendant of the subtree C1 or the subtree C2 in the tree T1 and that does not exist between the common substructures, and C1 (or C2). Each subtree that is the descendant of the subtree C1 or the subtree C2 in the tree T1 and that does not exist between the common substructures is, for example, (見かける(スーパー)) [English translation: (seen (supermarket))] and (小型) [English translation: (downsized)]

When each sentence includes three or more common substructures, the feature amount extraction unit 103 may extract feature amounts for all combinations thereof. The feature amount extraction unit 103 may extract feature amounts for combinations based on the dependency structures of the common substructures in the tree T1.

Then, the determination unit 104 confirms whether or not a feature vector including the feature amount extracted by the feature amount extraction unit 103 in step S204 satisfies a specific discrimination condition (step S205).

When the discrimination condition is satisfied in step S205 (YES in step S205), the determination unit 104 determines that the target sentence entails the hypothetical sentence (step S206).

When the discrimination condition is not satisfied in step S205 (NO in step S205), the determination unit 104 determines that the target sentence does not entail the hypothetical sentence (step S207).

The determination unit 104 may determine the entailment relationship between the target sentence and the hypothetical sentence by applying a specific discriminant model as a determination condition by using, for example, a support vector machine in step S205 to step S207. In such a case, for example, when the feature vector extracted in step S204 described above belongs to a space of entailment-side, among spaces divided by a discriminant hyperplane, the determination unit 104 determines that the target sentence entails the hypothetical sentence. When the feature vector extracted in step S204 described above belongs to the other side of space (not the entailment-side) among the spaces divided by the discriminant hyperplane described above, the determination unit 104 determines that the target sentence does not entail the hypothetical sentence. The determination unit 104 may use a classifier other than the support vector machine.

It will now be described that the textual entailment recognition apparatus 100 in the present example embodiment can correctly determine an entailment relationship when a target sentence does not entail a hypothetical sentence having a high coverage rate. It is also will be described below a method for the textual entailment recognition apparatus 100 in the present example embodiment to extract feature amount that enables to specify a portion that affects an entailment relationship between sentences.

The common substructures of the tree T1 that represents the target sentence T1 and the tree H1 that represents the hypothetical sentence H1 are the above-described subtree C1 and the above-described subtree C2.

The feature amount extraction unit 103 extracts a feature amount from the attributes of nodes that constitute the above-described subtree A1 with reference to the subtree A1. More specifically, the feature amount extraction unit 103 extracts, for example, a feature amount such as "case particle 'で' [Japanese car particle 'de'] exists", from a clause "緑黄色野菜 で" [English translation: (being) a green and yellow vegetable] which is the attribute of a node "(野菜)" [English translation: (vegetable)]. In other words, the case particle appears in a substructure (specifically, a clause which is the attribute of the substructure) that exists between common substructures (i.e., between C1 and C2) in the target sentence T1. In such a case, a relationship is changed between a common substructure which is the descendant of the substructure (existing between common substructures) and a common substructure which is the ancestor of the substructure (existing between common substructures).

For example, by setting of a condition "it is determined not to be entitled when a subtree between common substructures includes one or more case particles 'で' [Japanese case particle 'de']" as the discrimination condition, the determination unit 104 is able to recognize the above-described change in the relationship. When such a discrimination condition is set, the determination unit 104 can correctly determine that the target sentence T1 does not entail the hypothetical sentence H1. In other words, the determination unit 104 can determine the entailment relationship between the target sentence T1 and the hypothetical sentence H1 on the basis of the feature amount (for example, "a case particle appears in a subtree that exists between common substructures C1 and C2") extracted by the feature amount extraction unit 103, and the discrimination condition described above.

Such a discrimination condition is not limited only to the presence or absence of a case particle "de". Such a discrimination condition may be, for example, a condition that specifies a position in which a target (node, attribute of node, or the like) to be extracted as a feature amount appears in a sentence, with the use of a relationship between the position and a common substructure. Such a discrimination condition may be, for example, a condition that specifies the relative position of the position of a target to be extracted as a feature amount with respect to a common substructure. It is possible to select a feature amount that can indicate a portion that affects an entailment relationship by using such a discrimination condition.

The above-described specific example of the discrimination condition is an example in which a Japanese sentence is interpreted based on the Japanese grammar; however, the present example embodiment is not limited thereto. For example, according to each language of sentences as targets, such a discrimination condition may be set as appropriate based on a grammar relating to the language, and the like. In other words, the above-described operation of the determination unit 104 is applicable regardless of language (for example, also applicable to another language without limitation to the Japanese language).

In the textual entailment recognition apparatus 100 in the present example embodiment, such discrimination conditions need not be explicitly given. In other words, the determination unit 104 can learn the discrimination conditions by generating a discriminant model with the use of known machine learning in the textual entailment recognition apparatus 100 in the present example embodiment.

In such a case, the textual entailment recognition apparatus 100 can generate a discriminant model by, for example, preparing, as training data, a target sentence and a hypothetical sentence assigned with a label ("entailment" or "non-entailment") and a feature amount used in discrimination processing (entailment determination) of the sentences, and by executing known machine learning process. For example, the discriminant model may be generated in advance by a user of the textual entailment recognition apparatus 100, and the like, and may be set in the textual entailment recognition apparatus 100. By adopting a method using such machine learning, the discriminant model can be generated regardless of the language of a sentence as a target (i.e., without limitation to a specific language such as the Japanese language).

By the discriminant model, the determination unit 104 can determine whether or not the discrimination condition is satisfied in above step S205, as described above. In other words, the determination unit 104 can determine an entailment relationship of a group of an unlabeled target sentence and an unlabeled hypothetical sentence with the use of the discriminant model learned in advance.

Due to learning of such a discrimination condition (i.e., discriminant model) as described above, the textual entailment recognition apparatus 100 in the present example embodiment identifies a feature amount that can influence an entailment relationship between a target sentence and a hypothetical sentence included in a particular corpus. For example, on the basis of the result of determining an entailment relationship between a target sentence and a hypothetical sentence with the use of a discriminant model generated by executing machine learning with the use of a particular feature amount, it can be identified whether or not the feature amount influences the entailment relationship. The textual entailment recognition apparatus 100 in the present example embodiment can identify a substructure that affects an entailment relationship on the basis of the feature amount described above.

As described above, the feature amount extraction unit 103 in the present example embodiment focuses on common substructures included in a tree structure that represents a target sentence and a tree structure that represents a hypothetical sentence, and extracts a feature amount from a relationship between the common substructures. The feature amount extraction unit 103 extracts the feature amount on the basis of the relationship of the descendant nodes of the common substructures in the respective tree structures that represent the target sentence and the hypothetical sentence (for example, difference between descendant nodes, and the like).

The determination unit 104 in the present example embodiment identifies an entailment relationship between a target sentence and a hypothetical sentence on the basis of such feature amounts and discrimination conditions relating to the feature amounts. Therefore, the determination unit 104 can determine the correct entailment relationship of, for example, a hypothetical sentence that is not entailed in a target sentence despite having a high coverage rate with respect to the target sentence on the basis of a feature amount such as the degree of a difference relating to common substructures between the sentences.

The textual entailment recognition apparatus 100 in the present example embodiment can distinguish between a feature amount extracted from a relationship between common substructures in respective tree structures that represent a target sentence and a hypothetical sentence and a feature amount extracted from a difference between the descendant nodes of the common substructures.

Therefore, the textual entailment recognition apparatus 100 in the present example embodiment can distinguish between whether a relationship between common substructures in a target sentence and a hypothetical sentence affects an entailment relationship and whether the descendant node of each common substructure affects the entailment relationship. Thus, the textual entailment recognition apparatus 100 in the present example embodiment can identify a substructure that affects an entailment relationship.

When selecting common substructures from respective tree structures into which a target sentence and a hypothetical sentence are converted, the common substructure extraction unit 102 in the present example embodiment selects the common substructures, without overlaps, in decreasing order of the number of nodes included in the common substructures. For example, it is assumed that plural nodes having a same label are included in the tree structure that represents the target sentence and the tree structure that represents the hypothetical sentence (for example, high coverage rate and the like). In such a case, the textual entailment recognition apparatus 100 in the present example embodiment can suppress increase in the number of combinations of common substructures, caused by subdividing the common substructures. As a result, the textual entailment recognition apparatus 100 in the present example embodiment can ignore a relationship between common substructures that do not affect an entailment relationship.

As a result, the textual entailment recognition apparatus 100 in the present example embodiment can appropriately determine an entailment relationship between a target sentence and a hypothetical sentence by using a feature amount which is information that represents the structures of the sentences. More specifically, the textual entailment recognition apparatus 100 in the present example embodiment can appropriately determine, for example, an entailment relationship between sentences having a high coverage rate. The textual entailment recognition apparatus 100 in the present example embodiment can identify, for example, a portion that affects an entailment relationship in a structure that represents each sentence.

The textual entailment recognition apparatus 100 in the present example embodiment described above may be configured as a single apparatus (information-processing apparatus or the like) including all the components.

The textual entailment recognition apparatus 100 in the present example embodiment may be configured as a system in which one or more components are implemented by using plural apparatuses that are physically or logically separated (physical information-processing apparatuses, virtual information-processing apparatuses, and the like). In such a case, such plural apparatuses may be connected communicatively to each other by using any wired or wireless communication network or any combination of them. When such plural apparatuses are configured by virtual information-processing apparatuses and the like, the communication network described above may be a virtual communication network.

<Second Example Embodiment>

A second embodiment of the present invention will now be described in detail below. In the following description, characteristic portions according to the present example embodiment will be mainly described. The overlapping description of a configuration similar to the configuration of the first example embodiment will be omitted.

Figure 5:
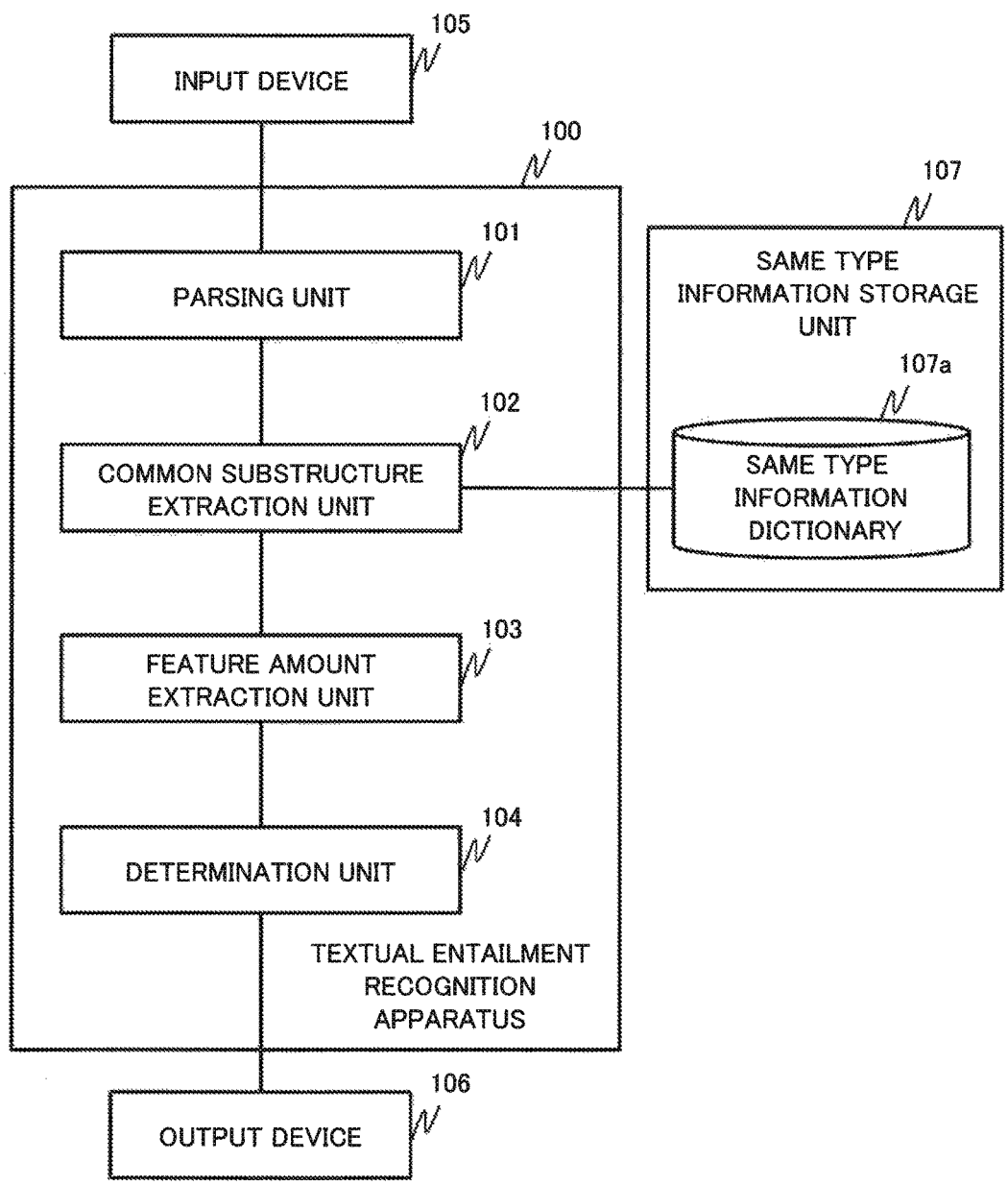
FIG. 5 is a block diagram illustrating the functional configuration of a textual entailment recognition apparatus according to a second example embodiment of the present invention.

First, the configuration of a textual entailment recognition apparatus 100 in the present example embodiment will be described with reference to FIG. 5. FIG. 5 is a block diagram illustrating the functional configuration of the textual entailment recognition apparatus 100 in the present example embodiment.

As illustrated in FIG. 5, the fundamental configuration of the textual entailment recognition apparatus 100 in the present example embodiment is similar to that of the first example embodiment described above. More specifically, a method for extracting a common substructure by a common substructure extraction unit 102 in the present example embodiment is different from that in the first example embodiment. Other components may be similar to those in the first example embodiment described above.

The textual entailment recognition apparatus 100 in the present example embodiment is connected communicatively to a same type information storage unit 107. In the present example embodiment, for example, the common substructure extraction unit 102 may be connected communicatively to the same type information storage unit 107.

The same type information storage unit 107 is a storage apparatus in which a same type information dictionary 107a is stored. The same type information storage unit 107 may be a storage device that provides any database, file system, and the like, or may be an information-processing apparatus including the storage device, or the like. Such a storage device may be implemented by adopting a well-known technology such as, for example, a hard disc drive (HDD) or a nonvolatile semiconductor storage apparatus, as appropriate. The same type information storage unit 107 may be configured as an element independent of the textual entailment recognition apparatus 100 (for example, FIG. 5), or may be configured as part of the textual entailment recognition apparatus 100.

Information in which a specific substructure (subtree) is associated with another substructure handled as the same as the specific substructure is stored in the same type information dictionary 107a. Specifically, at least one pair of a specific substructure and another substructure handled as the same as the specific substructure is stored in the same type information dictionary 107a. When a particular substructure and another substructure are handled as the same as each other, the common substructure extraction unit 102 can replace the substructures with each other. In other words, when a particular substructure and another substructure are registered in a pair in the same type information dictionary 107a, the common substructure extraction unit 102 can handle the substructures as virtual same type substructures. A pair of substructures handled as the same as each other may be registered in the same type information dictionary 107a in advance.

The common substructure extraction unit 102 and the same type information dictionary 107a in the present example embodiment will be described below with reference to specific examples.

The common substructure extraction unit 102 in the present example embodiment refers to the information of substructures (pair) that are registered in the same type information dictionary 107*a* and are handled as the same as each other when extracting common substructures.

Figure 6:
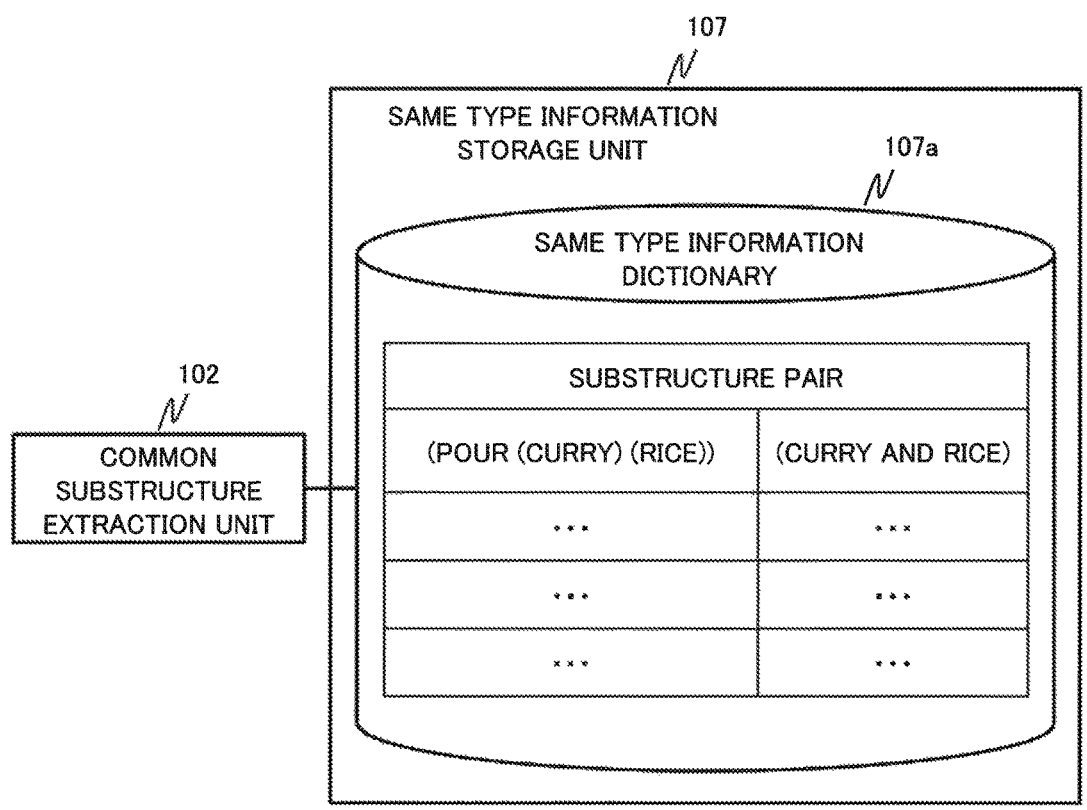
FIG. 6 is a view illustrating a specific example of substructures handled as the same type in the textual entailment recognition apparatus according to the second example embodiment of the present invention.

For example, as illustrated in FIG. 6, it is assumed that a substructure pair P1 "(かける(カレー)(ご飯)), (カレーライス)" [English translation: (pour (curry) (rice)), (curry and rice)] is registered in the same type information dictionary 107*a*. It is assumed that a target sentence T2 is "カレーをご飯にかけたもの が食べたい。" (English Translation: "I want to eat rice by pouring curry over the rice."), and a hypothetical sentence H2 is "カレーライス が食べたい。" (English Translation: "I want to each curry and rice."). In such a case, a tree T2 obtained by representing the target sentence T2 by a tree structure is "(食べる(かける(カレー)(ご飯)))" [English translation: (eat (pour (curry) (rice)))]. A tree H2 obtained by representing the hypothetical sentence H2 by a tree structure is "(食べる(カレーライス))" [English translation: (eat (curry and rice))].

For such a tree T2 and a tree H2, a common substructure extracted by the common substructure extraction unit 102 in the first example embodiment described above is only "(食べる)" [English translation: (eat)].

Figure 7:
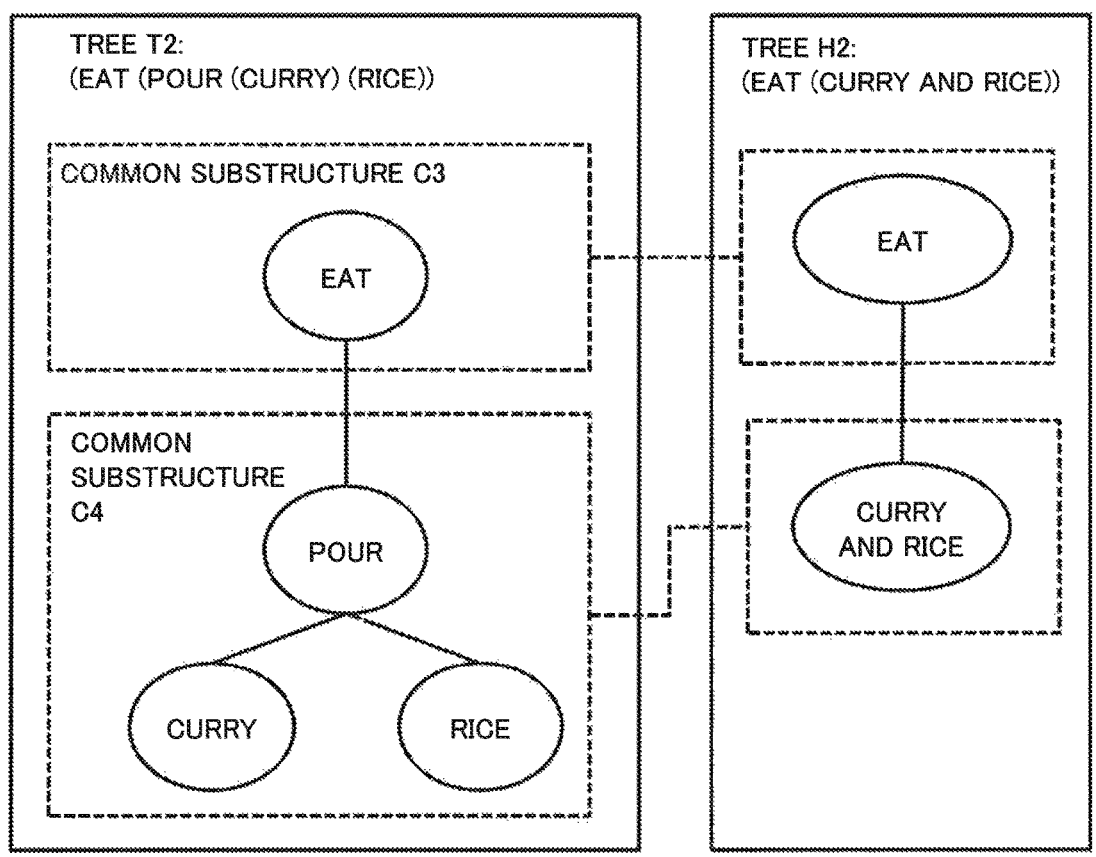
FIG. 7 is a view illustrating a specific example of common substructures extracted in the textual entailment recognition apparatus according to the second example embodiment of the present invention.

In contrast, the common substructure extraction unit 102 in the present example embodiment handles the substructure pair P1 "(かける(カレー)(ご飯)), (カレーライス)" [English translation: (pour (curry) (rice)), (curry and rice)] as the same substructures by using the same type information dictionary 107*a*. As a result, the common substructure extraction unit 102 in the present example embodiment extracts a common substructure C3 "(食べる)" [English translation: (eat)] and a common substructure C4 "(かける(カレー)(ご飯))=(カレーライス)" [English translation: (pour (curry) (rice))=(curry and rice)] as common substructures, as illustrated in FIG. 7.

The operation of the textual entailment recognition apparatus 100, configured as described above, in the present example embodiment will now be described. In the following, the operation of the common substructure extraction unit 102 will be primarily described. The other configurations may be the same as those in the first example embodiment described above, and therefore, the detailed description thereof is omitted.

Like the first example embodiment described above, first, the textual entailment recognition apparatus 100 in the present example embodiment executes steps S201 and S202 in the flowchart illustrated in FIG. 2. Such processing may be similar to the processing of the first example embodiment described above, and therefore, the detailed description thereof is omitted.

Figure 8:
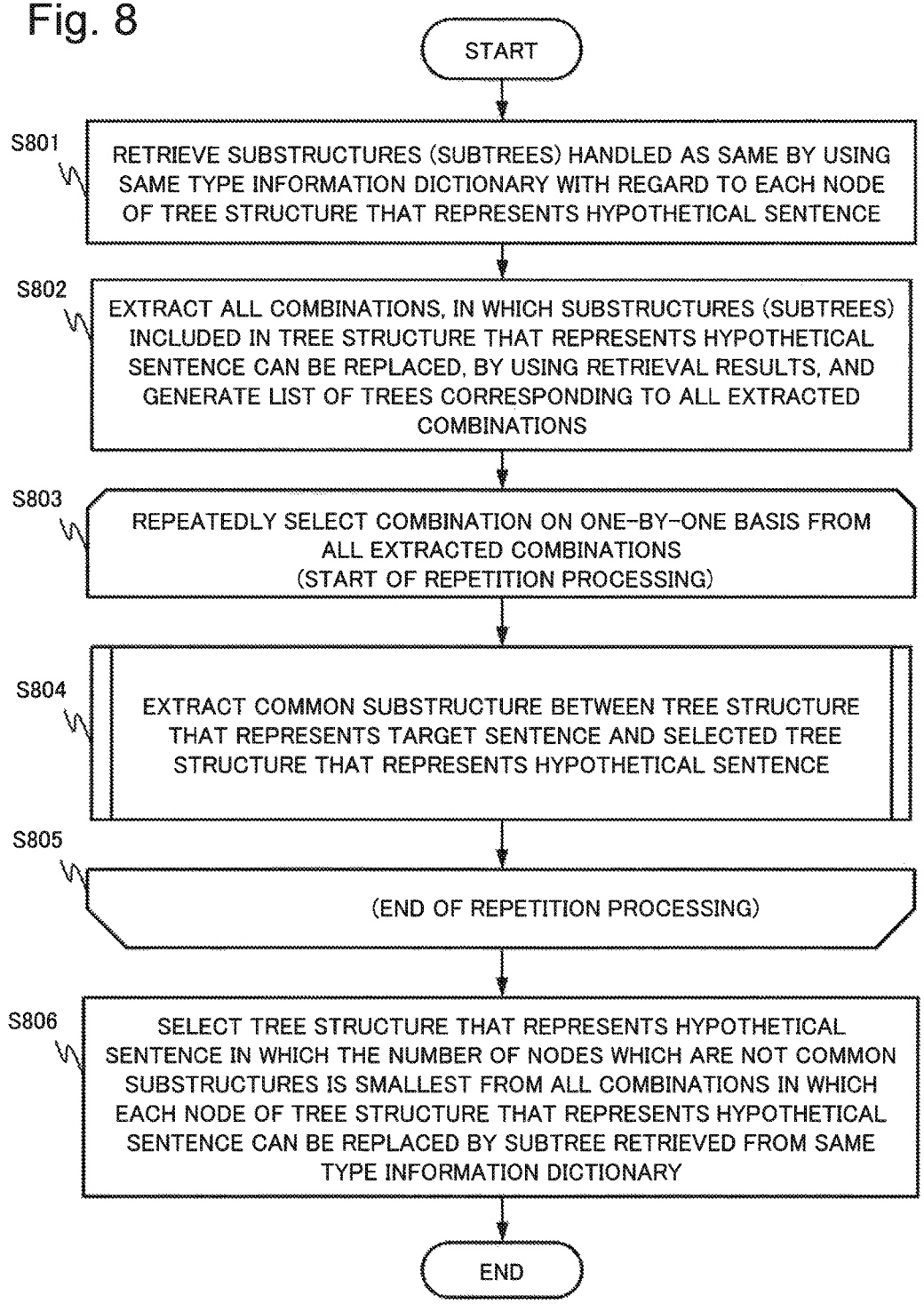
FIG. 8 is a flowchart illustrating the operation of extracting a common substructure in the textual entailment recognition apparatus according to the second example embodiment of the present invention.

Then, the common substructure extraction unit 102 detects candidates for substructures that have the same type and are common from the tree structures generated in step S202 described above. The processing of extracting the common substructures by the common substructure extraction unit 102 will be described below with reference to the flowchart illustrated in FIG. 8.

The common substructure extraction unit 102 in the present example embodiment refers to the same type information dictionary 107*a* stored in the same type information storage unit 107 when identifying the substructures having the same type. As described above, at least one pair of substructures regarded as the same as a particular substructure is registered in the same type information dictionary 107*a* stored in the same type information storage unit 107.

First, the common substructure extraction unit 102 searches the same type information dictionary 107*a* stored in the same type information storage unit 107 for substructures including, as a root node, each node of the tree structure that represents the hypothetical sentence (step S801). The common substructure extraction unit 102 extracts substructures handled as the same as the substructures in the hypothetical sentence, from the same type information dictionary 107*a*. In such a case, the common substructure extraction unit 102 may extract a list of the substructures handled as the same as the particular substructures included in the hypothetical sentence.

With regard to all elements (subtrees) included in the list described above, the common substructure extraction unit 102 then extracts combinations obtained by replacing the substructures included in the tree structure that represents the hypothetical sentence with the elements included in the list described above. With regard to all the extracted combinations, the common substructure extraction unit 102 generates a list of tree structures in which the substructures included in the tree structure that represents the hypothetical sentence are replaced (step S802). The combinations may include both the case of performing replacement of a substructure included in the tree structure that represents the hypothetical sentence with another substructure handled as the same as the substructure and the case of not executing the replacement.

Then, the common substructure extraction unit 102 selects each element from all the elements (tree structure that represents hypothetical sentence) included in the list of the trees generated in step S802 described above (step S803), and repeats the following processing (step S803 to step S805).

The common substructure extraction unit 102 extracts a common substructure between each element (tree structure that represents hypothetical sentence) selected in step S803 described above and the target sentence (step S804). Specific operation in step S804 may be similar to the operation of extracting common substructures (flowchart illustrated in FIG. 3), described in the first example embodiment described above. Therefore, the detailed description thereof is omitted.

When the above-described processing of all the elements included in the list extracted in step S802 ends (step S805), the common substructure extraction unit 102 continues the processing from step S806.

Then, the common substructure extraction unit 102 refers to the common substructures extracted in step S804. The common substructure extraction unit 102 selects a tree structure in which the number of nodes that are not common substructures (not included in common substructures) is the smallest, among all the tree structures that represent the hypothetical sentence included in the list extracted in step S802 (step S806).

More specifically, the common substructure extraction unit 102 confirms the common substructures between all the tree structures that represent the hypothetical sentence included in the list extracted in step S802 and the target sentence, extracted in step S804. The common substructure extraction unit 102 selects a tree structure in which the number of nodes other than the common substructures is the smallest (that is, the number of nodes included in the common substructures is the largest) among the tree structures that represent the hypothetical sentence included in the list extracted in step S802.

The common substructure extraction unit 102 outputs the selected tree structure that represents the hypothetical sentence as described above, the tree structure that represents the target sentence, and the selected common substructure as described above.

Similar to the first example embodiment described above, the textual entailment recognition apparatus 100 in the present example embodiment may continue the processing from step S204 illustrated in FIG. 2, after step S806 described above. The processing after step S204 may be similar to that in the first example embodiment described above, and therefore, the detailed description thereof is omitted.

As described above, the common substructure extraction unit 102 in the present example embodiment uses the information of the substructure pair registered in the same type information dictionary 107a. As a result, the common substructure extraction unit 102 replaces a substructure included in the hypothetical sentence with another substructure handled as the same as the substructure. In other words, the common substructure extraction unit 102 in the present example embodiment can transform the tree structures that represent the hypothetical sentence by replacing at least some of the tree structures that represent the hypothetical sentence with other substructures.

For example, it is assumed that same type information such as a synonym or a paraphrase can be obtained in advance. In such a case, the common substructure extraction unit 102 can replace substructures that represent equivalent meaning, even if the substructures are expressed differently, with each other by registering a pair of substructures handled as the same as each other in the same type information dictionary 107a by use of such same type information.

As a result, the common substructure extraction unit 102 can extract a common substructure, for example, even if there is variation in notation between a target sentence and a hypothetical sentence.

That is, the textual entailment recognition apparatus 100 in the present example embodiment extracts a feature amount by using units of expression (substructures) that represent equivalent meaning even if the notation of the expression are different, and can carry out entailment determination using the feature amount.

The textual entailment recognition apparatus 100 in the present example embodiment has the configuration similar to the configuration of the first example embodiment described above, and therefore exhibits an effect similar to the effect of the first example embodiment described above.

<Third Example Embodiment>

Figure 9:
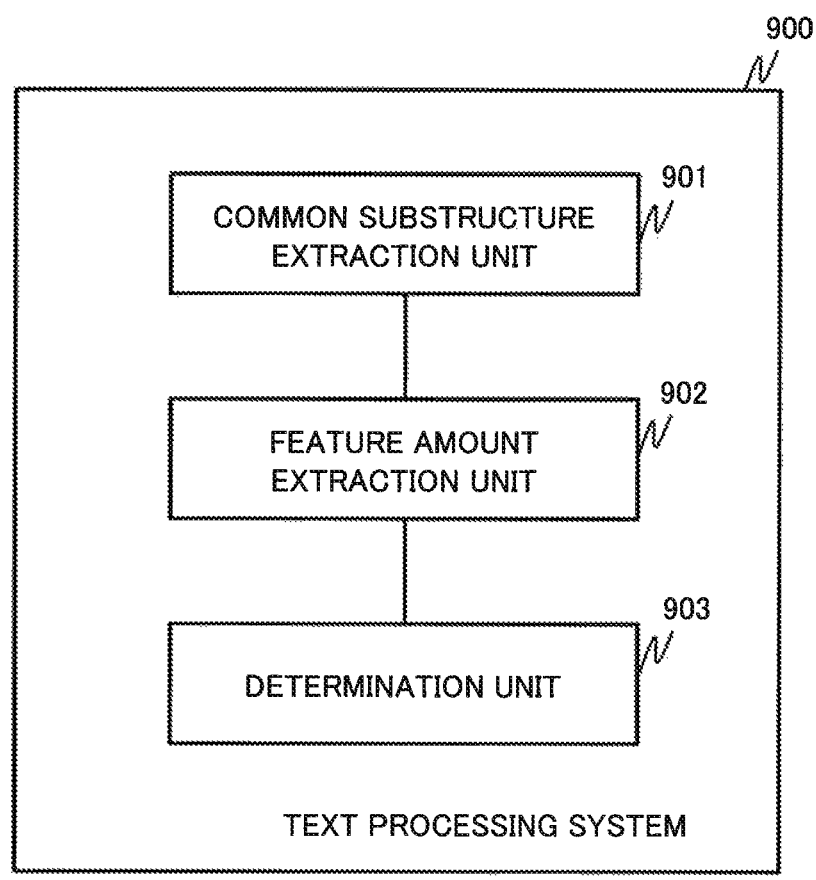
FIG. 9 is a block diagram illustrating the functional configuration of a text processing system according to a third example embodiment of the present invention.

A third example embodiment of the present invention will now be described. FIG. 9 is a block diagram illustrating the functional configuration of a text processing system 900 according to a third example embodiment of the present invention.

The text processing system 900 according to the present example embodiment includes a common substructure extraction unit (common substructure extraction means) 901, a feature amount extraction unit (feature amount extraction means) 902, and a determination unit (determination means) 903. The text processing system 900 according to the present example embodiment may be configured by a single apparatus (information-processing apparatus or the like) including these components. The text processing system 900 according to the present example embodiment may be configured as a system in which these components are implemented by using plural apparatuses that are physically or logically separated (physical information-processing apparatus, virtual information-processing apparatus, or the like). In such a case, such plural apparatuses may be connected communicatively to each other by using any wired or wireless communication network or combination of them. When such plural apparatuses are configured by virtual information-processing apparatuses and the like, the communication network described above may be a virtual communication network.

Each component of the text processing system 900 according to the present example embodiment will be described below.

On the basis of a structure that represents a first sentence and a structure that represents a second sentence, the common substructure extraction unit 901 extracts common substructures which are the structures of portions that are common to the structures and have the same type.

The first sentence described above may be similar to the target sentence in each of the example embodiments described above, and the second sentence described above may be similar to the hypothetical sentence in each of the example embodiments described above.

Like each of the example embodiments described above, the structure that represents the first sentence may be a tree structure generated from the result of executing morphological analysis, dependency structure analysis, and the like of the first sentence. Similarly, like each of the example embodiments described above, the structure that represents the second sentence may be a tree structure generated from the result of executing morphological analysis, dependency structure analysis, and the like of the second sentence. The common substructures described above may be subtrees or nodes that are common to the tree structure that represents the first sentence and the tree structure that represents the second sentence.

The common substructure extraction unit 901 in the present example embodiment may function as, for example, common substructure extraction means which can achieve functionality similar to the functionality of the common substructure extraction unit 102 in each of the example embodiments described above.

The feature amount extraction unit 902 extracts at least one of a feature amount based on a dependency relationship between the one or more common substructures described above, and a feature amount based on a dependency relationship between the common substructures and the substructures different from the common substructures described above, in each of the first and second sentences described above.

Specifically, the feature amount extraction unit 902 may extract a feature amount based on a dependency relationship between the one or more common substructures in the first sentence and on a dependency relationship between the one or more common substructures in the second sentence.

The feature amount extraction unit 902 may extract a feature amount by the following method. That is, the feature amount extraction unit 902 extracts, for example, a dependency relationship (first dependency relationship) between the common substructures in the first sentence and the substructures different from the common substructures. The feature amount extraction unit 902 also extracts a dependency relationship (second dependency relationship) between the common substructures and the substructures different from the common substructures in the second sentence. The feature amount extraction unit 902 may extract a feature amount based on such a first dependency relationship and such a second dependency relationship (feature amount based on a difference between the first dependency relationship and the second dependency relationship).

The feature amount extraction unit 902 in the present example embodiment may function as feature amount extraction means which can achieve functionality similar to the functionality of the feature amount extraction unit 103 in each of the example embodiments described above.

The determination unit 903 determines an entailment relationship between the first sentence and the second sentence by using the extracted feature amount. More specifically, the determination unit 903 may determine the entailment relationship between the first sentence and the second sentence on the basis of the feature amount extracted by the feature amount extraction unit 902 and a specific discrimination condition relating to the feature amount.

The determination unit 903 in the present example embodiment may function as determination means which can achieve functionality similar to the functionality of the determination unit 104 in each of the example embodiments described above.

As described above, the text processing system 900 in the present example embodiment extracts the common substructures in the respective structures that represent the first sentence and the second sentence. The text processing system 900 extracts feature amounts on the basis of relationships between the common substructures or relationships between the common substructures and other substructures.

The text processing system 900 in the present example embodiment determines the entailment relationship between the first sentence and the second sentence, on the basis of, for example, the feature amounts, discrimination conditions for the feature amounts, and the like. That is, the text processing system 900 according to the present example embodiment configured as described above can determine an entailment relationship between two or more texts (documents), like the textual entailment recognition apparatus 100 in each of the example embodiments described above.

As a result, in accordance with the text processing system 900 in the present example embodiment, entailment relationship between sentences (first sentence and second sentence) which are object of entailment determination can be determined by use of feature amounts that represent the structures of the sentences. More specifically, the text processing system 900 in the present example embodiment can appropriately determine an entailment relationship between sentences having a high coverage rate. The text processing system 900 in the present example embodiment can identify a portion that affects the entailment relationship in the structure that represents each of the sentences.

<Configurations of Hardware and Software Program (Computer Program)>

The configurations of hardware and a software program that can implement each of the example embodiments described above will be described below. In particular, the configurations of the textual entailment recognition apparatus 100 in each of the example embodiments described above, and the text processing system 900 will be described below. Hereinafter, each component of the textual entailment recognition apparatus 100 and the text processing system 900 may be collectively referred to as "text processing system or the like". In the following, each component (common substructure extraction unit 901, feature amount extraction unit 902, and determination unit 903) of the text processing system 900 may be implemented by a single apparatus, or may be implemented by plural different apparatuses.

The text processing system or the like described in each of the example embodiments described above may be configured by a dedicated hardware apparatus. In such a case, each unit illustrated in each figure described above may be implemented as hardware of which part or the entirety is integrated (integrated circuit on which processing logic is implemented, or the like).

Figure 12:
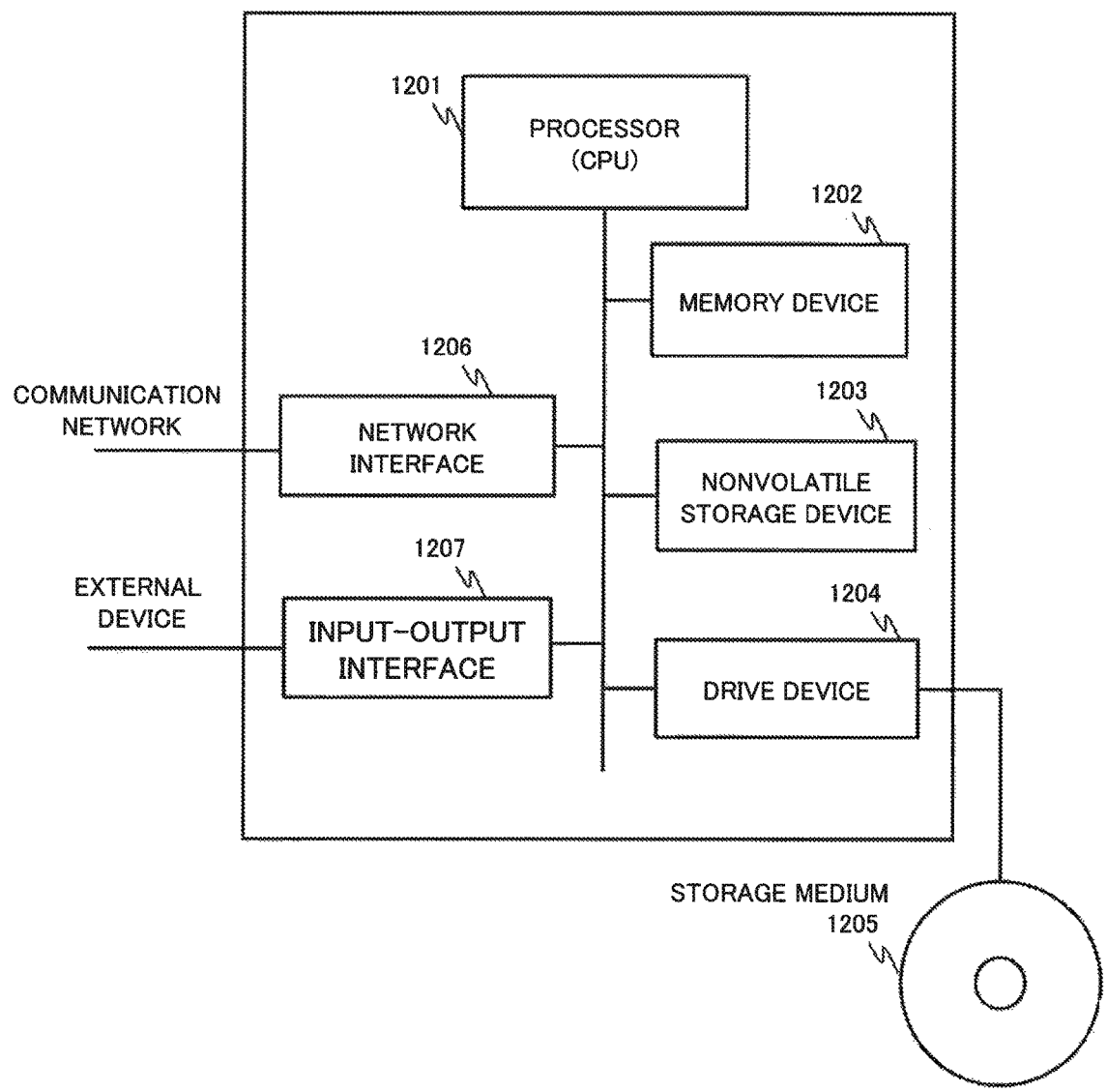
FIG. 12 is a block diagram illustrating the hardware configuration of an information-processing apparatus that can implement components that configure the textual entailment recognition apparatus or the text processing system according to each example embodiment of the present invention.

The above-described text processing system or the like may be configured by such hardware as illustrated in FIG. 12 and various software programs (computer programs) executed by such hardware.

A processor 1201 in FIG. 12 is a processing device such as a general-purpose CPU (Central Processing Unit) or a microprocessor. For example, the processor 1201 may read, into a memory device 1202, various software programs stored in a nonvolatile storage device 1203 described later, and may execute processing according to such software programs.

The memory device 1202 is a memory such as RAM (Random Access Memory) or the like to which the processor 1201 can refer. The memory device 1202 may store software programs, various items of data, and the like. The memory device 1202 may be a volatile memory.

The nonvolatile storage device 1203 is a nonvolatile storage such as, for example, ROM (Read Only Memory) with a semiconductor storage device, or flash memory. The nonvolatile storage device 1203 may store various software programs, data, and the like.

A drive device 1204 is, for example, a device that processes reading and writing of data on a storage medium 1205 described later.

The storage medium 1205 is any recording medium on which data can be recorded, such as, for example, an optical disk, a magneto-optical disk, or semiconductor flash memory.

A network interface 1206 is an interface device through which the text processing system or the like, and any wired or wireless communication network or any combination of them are connected communicatively to each other. When the textual entailment recognition apparatus 100 in each of the example embodiments described above, or the text processing system 900 is configured by the combination of plural apparatuses configured by the hardware illustrated in FIG. 12, the apparatuses may be connected communicatively to each other via the network interface 1206.

An input-output interface 1207 is an interface to which an input device that accepts various inputs into the text processing system or the like, and an output device that accepts various outputs from the text processing system or the like are connected. For example, the input device 105 and the output device 106 in the first and second example embodiments described above may be connected to the textual entailment recognition apparatus 100 via the input-output interface 1207.

The present invention described by taking each of the example embodiments described above as an example may be achieved by, for example, configuring the text processing system or the like with the hardware apparatus illustrated in FIG. 12, and supplying a software program that can implement functionality described in each of the example embodiments described above to such a text processing system or the like. In such a case, the present invention may be accomplished by allowing the processor 1201 to execute the software program supplied to such a text processing system or the like.

In each of the example embodiments described above, each unit illustrated in each figure described above can be implemented as a software module which is the functional (processing) unit of a software program executed by the hardware described above. However, the division of each software module illustrated in the drawings exhibits a configuration for convenience of explanation, and various configurations can be adopted for implementation.

For example, when the text processing system and the like illustrated in FIG. 1, FIG. 5, and FIG. 9 are implemented as software modules, the text processing system and the like may be configured to store the software modules in the nonvolatile storage device 1203, and to read the software modules into the memory device 1202 when the processor 1201 executes each processing.

The software modules may be configured so that various data can be transferred from the software modules to each other by use of an appropriate method such as shared memory or interprocess communication. Such a configuration enables the software modules to be connected communicatively to each other.

Further, each of the software programs described above may be recorded on the storage medium 1205. In such a case, the text processing system described above may be configured so that the software programs are stored in the nonvolatile storage device 1203 through the drive device 1204 as appropriate in a shipment phase, an operation phase, or the like.

In the case described above, for example, a method of installing the various software programs on the text processing system and the like with the use of an appropriate tools in a manufacturing phase before shipment, a maintenance phase after the shipment, or the like may be adopted as a method of supplying the various software programs to the text processing system and the like. The method of supplying the various software programs may use a currently generalized method such as downloading the various software programs via a communication line such as the Internet.

In such a case, the present invention can be considered to be configured by a code that implements such a software program or by a computer-readable storage medium on which such a code is recorded.

The present invention was described above as the examples applied to the example embodiments described above. However, the technical scope of the present invention is not limited to the scope described in each of the example embodiments described above. It is obvious to a person skilled in the art that various modifications or improvements can be made to such example embodiments. In such a case, new example embodiments obtained by making such modifications or improvements can be included within the technical scope of the present invention. This is obvious from matters described in claims.

Some or all of the example embodiments and alternative examples thereof can be described as the following supplementary notes. However, the present invention illustratively described with reference to the example embodiments described above and alternative examples thereof is not limited to the following.

(Supplementary Note 1)

A text processing system including:
 common substructure extraction means that extracts a common substructure that is a partial structure of a same type, the partial structure being common to a first sentence and a second sentence and, based on the a structure representing the first sentence and a structure representing the second sentence;
 feature amount extraction means that extracts at least one of
  a feature amount based on a dependency relationship between the at least one common substructure in the first and second sentences and
  a feature amount based on a dependency relationship between the common substructure in the first and second sentences and a substructure different from the common substructure; and
 determination means that determines an entailment relationship between the first sentence and the second sentence by using the extracted feature amount.

(Supplementary Note 2)

The text processing system according to SUPPLEMENTARY NOTE 1, wherein
 when at least one candidate for the common substructure which is a subtree of a same type, included in a first tree structure which is the structure representing the first sentence and a second tree structure which is the structure representing the second sentence, exists,
 the common substructure extraction means extracts the common substructure by selecting the candidate for the common substructure which does not overlap with the other candidate for the common substructure from one or more candidates for the common substructure, based on the number of nodes included in the candidate for the common substructure.

(Supplementary Note 3)

The text processing system according to SUPPLEMENTARY NOTE 2, wherein
 when the plurality of common substructures exist, the feature amount extraction means extracts the feature amount comprising at least information that represents a relationship between a dependency relationship between the common substructures in the structure representing the first sentence and a dependency relationship between the common substructures in the structure representing the second sentence.

(Supplementary Note 4)

The text processing system according to SUPPLEMENTARY NOTE 2 or SUPPLEMENTARY NOTE 3, wherein
 when the plurality of common substructures exist, the feature amount extraction means extracts the feature amount based on at least one of the number of nodes and attributes of nodes, the nodes being included in a substructure existing between a particular common substructure and the other common substructure among the plurality of common substructures.

(Supplementary Note 5)

The text processing system according to any of SUPPLEMENTARY NOTE 2 to SUPPLEMENTARY NOTE 4, wherein
 the feature amount extraction means extracts the feature amount based on at least one of the number of nodes and attributes of nodes, the nodes being included in a substructure which is a descendant of a particular common substructure, and which does not exist between the particular common substructure and the other common substructure, among the first tree structure and the second tree structure.

(Supplementary Note 6)

The text processing system according to any of SUPPLEMENTARY NOTE 2 to SUPPLEMENTARY NOTE 6, further including:
 same type information storage means that stores, with regard to one or more substructures, same type information relating to another substructure having a type same as the type of the substructure among one or more substructures, wherein
 the common substructure extraction means
 replaces at least one of a substructure included in the first tree structure and a substructure included in the second tree structure, with the other substructure of which the type is the same as the type of the respective substructure included in the first tree structure and the second tree structure, based on the same type information stored in the same type information storage means; and extracts the common substructure based on the first tree structure and the second tree structure after the replacement.

(Supplementary Note 7)

The text processing system according to SUPPLEMENTARY NOTE 6, wherein the common substructure extraction means, with regard to all combinations of replacing at least one of the substructure included in the first tree structure and the substructure included in the second tree structure with the other substructure, of which the type is the same as the type of the respective substructure included in the first tree structure and the second tree structure, based on the same type information stored in the same type information storage means, extracts a candidate for the common substructure in the combinations based on the first tree structure and the second tree structure after the replacement; and extracts, as the common substructure, the candidate for the common substructure which minimizes the number of nodes that is included in the second tree structure after the replacement and that is not the candidate of the common substructure, in the extracted candidate for the common substructure.

(Supplementary Note 8)

A text processing method including:

by an information-processing apparatus, extracting a common substructure that is a partial structure of a same type, the partial structure being common to a first sentence and a second sentence, based on a structure representing the first sentence and a structure representing the second sentence;

extracting at least one of a feature amount based on a dependency relationship between the at least one common substructure in the first and second sentences and a feature amount based on a dependency relationship between the common substructure in the first and second sentences and a substructure different from the common substructure; and determining an entailment relationship between the first sentence and the second sentence by using the extracted feature amount.

(Supplementary Note 9)

A storage medium storing a computer program, the computer program allowing a computer to execute:

processing of extracting a common substructure which is a partial structure of a same type, the partial structure being common to a first sentence and a second sentence, based on a structure representing the first sentence and a structure representing the second sentence;

processing of extracting at least one of a feature amount based on a dependency relationship between the at least one common substructure in the first and second sentences and a feature amount based on a dependency relationship between the common substructure in the first and second sentences and a substructure different from the common substructure; and processing of determining an entailment relationship between the first sentence and the second sentence by using the extracted feature amount.

(Supplementary Note 10)

A text processing apparatus, being a single integrated apparatus, including:

common substructure extraction means that extracts a common substructure that is a partial structure of a same type, the partial structure being common to a first sentence and a second sentence and, based on the a structure representing the first sentence and a structure representing the second sentence;

feature amount extraction means that extracts at least one of a feature amount based on a dependency relationship between the at least one common substructure in the first and second sentences and a feature amount based on a dependency relationship between the common substructure in the first and second sentences and a substructure different from the common substructure; and determination means that determines an entailment relationship between the first sentence and the second sentence by using the extracted feature amount.

(Supplementary Note 11)

The text processing system according to SUPPLEMENTARY NOTE 2, wherein when one or more candidates for the common substructure are included in the first tree structure and the second tree structure, the common substructure extraction unit selects a candidate for the common substructure which does not overlap with the other candidate for the common substructure from the one or more candidates for the common substructure in decreasing order of the number of nodes included in the candidate for the common substructure based on a predetermined criterion, and extracting the selected candidate for the common substructure as the common substructure.

(Supplementary Note 12)

The text processing system according to SUPPLEMENTARY NOTE 3, wherein when one or more common substructures exist, the feature amount extraction unit extracts the feature amount including at least information that represents whether a dependency relationship between the common substructures in the structure representing the first sentence and a dependency relationship between the common substructures in the structure representing the second sentence are the same or not.

(Supplementary Note 13)

The text processing system according to SUPPLEMENTARY NOTE 2, wherein when at least one candidate for the common substructure which is the subtree of the same type, included in the first tree structure which is the structure representing the first sentence and the second tree structure which is the structure representing the second sentence, exists, the common substructure extraction means extracts the common substructure by selecting the candidate for the common substructure in which the number of nodes included in the candidate for the common substructure is largest, and which does not overlap with the other candidate for the common substructure, from the one or more candidates for the common substructure.

INDUSTRIAL APPLICABILITY

The present invention can be applied to, for example, an information retrieval apparatus that retrieves another sentence entailing a specific sentence from a corpus, a computer program for implementing the information retrieval apparatus by using an information-processing apparatus, and the like.

The present invention can also be applied to a question answering apparatus that retrieves a sentence entailed in a question sentence from an answer sentence corpus and answers a retrieval result, a computer program for be implementing the question answering apparatus by using an information-processing apparatus, and the like.

The present invention was described above by taking the above-described example embodiments as examples. However, the present invention is not limited to the example embodiments described above. Various aspects that can be understood by a person skilled in the art can be applied to the present invention within the scope of the present invention.

This application claims priority based on Japanese Patent Application No. 2014-180828, which was filed on Sep. 5, 2014, and of which the entire disclosure is incorporated herein.

What is claimed is:

1. A textual entailment recognition system comprising:
at least one processor that is configured to:
extract a first structure representing a first sentence and a second structure representing a second sentence, wherein the first structure and the second structure are each trees including linked nodes each representing one or more words;
determine whether the first structure and the second structure include at least one common substructure that is of a same type;
extract a first dependency relationship between the at least one common substructure in the first structure and a substructure in the first structure that is different from the at least one common substructure;
extract a second dependency relationship between the least one common substructure in the second structure and a substructure in the second structure that is different from the at least one common substructure;
extract a feature amount based on a difference between the extracted first dependency relationship and the extracted second dependency relationship; and
determine a textual entailment relationship between the first sentence and the second sentence by using the extracted feature amount that is based on the difference between the extracted first dependency relationship and the extracted second dependency relationship.

2. The text processing system according to claim 1, wherein the at least one processor is further configured to: when at least one candidate for the at least one common substructure which is a subtree of a same type, included in a first tree structure which is the first structure representing the first sentence and a second tree structure, which is the second structure representing the second sentence, exists, extract the at least one common substructure by selecting a candidate for the at least one common substructure that does not overlap with another candidate for the at least one common substructure from two or more candidates for the at least one common substructure, based on a number of nodes included in the respective candidates for the at least one common substructure.

3. The text processing system according to claim 2, wherein the at least one processor is further configured to: when the at least one candidate for the at least one common substructure which is the subtree of the same type, included in the first tree structure and the second tree structure exists, extract the at least one common substructure by selecting a candidate for the at least one common substructure in which the number of nodes included in the candidate for the common substructure is largest, and which does not overlap with the other candidate for the at least one common substructure, from the one or more candidates for the at least one common substructure.

4. The text processing system according to claim 3, further comprising: a memory that stores, with regard to one or more substructures, same type information relating to another substructure having a type that is the same as the type of the substructure among one or more substructures, wherein the at least one processor is further configured to:
replace at least one of a substructure included in the first tree structure and a substructure included in the second tree structure, with the other substructure of which the type is the same as the type of the respective substructure included in the first tree structure and the second tree structure, based on the same type information stored in the memory; and
extract the at least one common substructure based on the first tree structure and the second tree structure after the replacement.

5. The text processing system according to claim 2, wherein the at least one processor is further configured to: when a plurality of common substructures exist, extract the feature amount based on at least one of the number of nodes included in the respective candidates for the at least one common substructure and attributes of those respective nodes, the respective nodes being included in a substructure existing between a particular common substructure and the other common substructure among the plurality of common substructures.

6. The text processing system according to claim 5, wherein the at least one processor is further configured to: determine the textual entailment relationship between the first sentence and the second sentence according to whether a feature vector, being generated from the extracted feature amount, satisfies a determination condition provided by a discriminant model, the discriminant model being learned using a feature amount extracted from training data prepared in advance.

7. The text processing system according to claim 5, wherein at least one processor is further configured to: when a feature vector, being generated from the extracted feature amount represents a grammatical structure of the first sentence and the second sentence, determine whether the textual entailment relationship between the first sentence and the second sentence exists according to whether the feature vector satisfies a determination condition that is defined on the basis of a grammar of language of the first sentence and the second sentence.

8. The text processing system according to claim 5, further comprising: a memory that stores, with regard to one or more substructures, same type information relating to another substructure having a type that is the same as the type of the substructure among one or more substructures, wherein the at least one processor is further configured to:
replace at least one of a substructure included in the first tree structure and a substructure included in the second tree structure, with the other substructure of which the type is the same as the type of the respective substructure included in the first tree structure and the second tree structure, based on the same type information stored in the memory; and extract the at least one common substructure based on the first tree structure and the second tree structure after the replacement.

9. The text processing system according to claim 2, wherein the at least one processor is further configured to: extract the feature amount based on at least one of the number of nodes included in the respective candidates for the at least one common substructure and attributes of those respective nodes, the respective nodes being included in a substructure which is a descendant of a particular common substructure, and which does not exist between the particular common substructure and the other common substructure, among the first tree structure and the second tree structure.

10. The text processing system according to claim 9, wherein the at least one processor is further configured to: determine the textual entailment relationship between the first sentence and the second sentence according to whether a feature vector, being generated from the extract feature amount, satisfies a determination condition provided by a discriminant model, the discriminant model being learned using the feature amount extracted from training data prepared in advance.

11. The text processing system according to claim 9, wherein at least one processor is further configured to: when a feature vector, being generated from the extracted feature amount represents a grammatical structure of the first sentence and the second sentence, determine whether the textual entailment relationship between the first sentence and the second sentence exists according to whether the feature vector satisfies a determination condition that is defined on the basis of a grammar of language of the first sentence and the second sentence.

12. The text processing system according to claim 9, further comprising: a memory that stores, with regard to one or more substructures, same type information relating to another substructure having a type that is the same as the type of the substructure among one or more substructures, wherein the at least one processor is further configured to:
  replace at least one of a substructure included in the first tree structure and a substructure included in the second tree structure, with the other substructure of which the type is the same as the type of the respective substructure included in the first tree structure and the second tree structure, based on the same type information stored in the memory; and
  extract the at least one common substructure based on the first tree structure and the second tree structure after the replacement.

13. The text processing system according to claim 2, further comprising: a memory that stores, with regard to one or more substructures, same type information relating to another substructure having a type that is the same as the type of the substructure among one or more substructures, wherein the at least one processor is further configured to:
  replace at least one of a substructure included in the first tree structure and a substructure included in the second tree structure, with the other substructure of which the type is the same as the type of the respective substructure included in the first tree structure and the second tree structure, based on the same type information stored in the memory; and
  extract the at least one common substructure based on the first tree structure and the second tree structure after the replacement.

14. The text processing system according to claim 13, wherein the at least one processor is further configured to: with regard to all combinations of replacing at least one of the substructure included in the first tree structure and the substructure included in the second tree structure with the other substructure, of which the type is the same as the type of the respective substructure included in the first tree structure and the second tree structure, based on the same type information stored in the memory, extract a candidate for the at least one common substructure in the combinations based on the first tree structure and the second tree structure after the replacement; and
  extract, as the at least one common substructure, a candidate for the at least one common substructure that minimizes the number of nodes that are included in the second tree structure after the replacement and that is not the candidate of the at least one common substructure, in the extracted candidate for the at least one common substructure.

15. The text processing system according to claim 1, wherein the at least one processor is further configured to:
  determine the textual entailment relationship between the first sentence and the second sentence according to whether a feature vector, being generated from the extracted feature amount, satisfies a determination condition provided by a discriminant model, the discriminant model being learned using a feature amount extracted from training data prepared in advance.

16. The text processing system according to claim 1, further comprising: a memory that stores, with regard to one or more substructures, same type information relating to another substructure having a type that is the same as the type of the substructure among one or more substructures, wherein the at least one processor is further configured to:
  replace at least one of a substructure included in the first tree structure and a substructure included in the second tree structure, with the other substructure of which the type is the same as the type of the respective substructure included in the first tree structure and the second tree structure, based on the same type information stored in the memory; and
  extract the at least one common substructure based on the first tree structure and the second tree structure after the replacement.

17. A textual entailment recognition method that is performed by at least one processor, the method comprising:
  extracting a first structure representing a first sentence and a second structure representing a second sentence, wherein the first structure and the second structure are each trees including linked nodes each representing one or more words;
  determining whether the first structure and the second structure include at least one common substructure that is of a same type;
  extracting a first dependency relationship between the at least one common substructure in the first structure and a substructure in the first structure that is different from the at least one common substructure;
  extracting a second dependency relationship between the at least one common substructure in the second structure and a substructure in the second structure that is different from the at least one common structure;
  extracting a feature amount based on a difference between the extracted first dependency relationship and the extracted second dependency relationship; and
  determining a textual entailment relationship between the first sentence and the second sentence by using the extracted feature amount that is based on the difference between the extracted first dependency relationship and the extracted second dependency relationship.

18. A non-transitory computer-readable storage medium storing a computer program, the computer program comprising computer-executable instructions that, when executed by a computer, cause the computer to:
  extract a first structure representing a first sentence and a second structure representing a second sentence, wherein the first structure and the second structure are each trees including linked nodes each representing one or more words;
  determine whether the first structure and the second structure include at least one common substructure that is of a same type;
  extract a first dependency relationship between the at least one common substructure in the first structure and a substructure in the first structure that is different from the at least one common substructure;
  extract a second dependency relationship between the at least one common substructure in the second structure and a substructure in the second structure that is different from the at least one common substructure;
  extract a feature amount based on a difference between the extracted first dependency relationship and the extracted second dependency relationship; and
  determine a textual entailment relationship between the first sentence and the second sentence by using the extracted feature amount that is based on the difference between the extracted first dependency relationship and the extracted second dependency relationship.

* * * * *